(12) United States Patent
Miyabe et al.

(10) Patent No.: US 7,085,464 B2
(45) Date of Patent: Aug. 1, 2006

(54) OPTICAL FIBER HAVING HIGH NONLINEARITY

(75) Inventors: Ryo Miyabe, Tokyo (JP); Jiro Hiroishi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/041,439

(22) Filed: Jan. 25, 2005

(65) Prior Publication Data

US 2005/0163444 A1   Jul. 28, 2005

(30) Foreign Application Priority Data

Jan. 26, 2004 (JP) ............................. 2004-017179
Apr. 21, 2004 (JP) ............................. 2004-125001

(51) Int. Cl.
*G02B 6/36* (2006.01)

(52) U.S. Cl. ........................ 385/127; 385/122

(58) Field of Classification Search .................... None
See application file for complete search history.

(56) References Cited

U.S. PATENT DOCUMENTS

| | | | | |
|---|---|---|---|---|
| 4,635,263 A | * | 1/1987 | Mollenauer | 372/3 |
| 6,009,221 A | * | 12/1999 | Tsuda | 385/123 |
| 6,522,818 B1 | * | 2/2003 | Aso et al. | 385/122 |
| 6,766,087 B1 | * | 7/2004 | Hiroishi et al. | 385/122 |
| 6,865,328 B1 | * | 3/2005 | Berkey et al. | 385/123 |
| 2003/0161600 A1 | * | 8/2003 | Mukasa | 385/127 |
| 2004/0105615 A1 | * | 6/2004 | Okuno | 385/16 |
| 2005/0111802 A1 | * | 5/2005 | Lee et al. | 385/123 |

FOREIGN PATENT DOCUMENTS

JP    2002-207136    7/2002

* cited by examiner

*Primary Examiner*—Rodney Bovernick
*Assistant Examiner*—Mike Stahl
(74) *Attorney, Agent, or Firm*—Oblon, Spivak, McClelland, Maier & Neustadt, P.C.

(57) ABSTRACT

An optical fiber includes a first core with a first refractive index located in a central portion of the optical fiber; a second core with a second refractive index located in an outer periphery of the first core; a third core with a third refractive index located in an outer periphery of the second core; and a cladding with a fourth refractive index located in an outer periphery of the third core, where among the refractive indices, the first one>the third one>the fourth one>the second one. The absolute value of dispersion at the wavelength of 1550 nm is not more than 20 ps/nm/km. The effective area at the wavelength is not more than 15 $\mu m^2$. The nonlinear constant $n_2/Aeff$ at the wavelength of 1550 nm is equal to or more than $25\times10^{-10}$/W.

41 Claims, 12 Drawing Sheets

REFRACTIVE INDEX PROFILE OF OPTICAL FIBER

RELATION BETWEEN RELATIVE INDEX DIFFERENCE Δ3 AND DISPERSION SLOPE

RELATION BETWEEN RELATIVE INDEX DIFFERENCE Δ3 AND Aeff

RELATION BETWEEN RELATIVE INDEX
DIFFERENCE Δ3 AND CUT-OFF WAVELENGTH

RELATION BETWEEN RELATIVE INDEX
DIFFERENCE Δ1 AND Aeff

RELATION BETWEEN D1/D2 AND
DISPERSION SLOPE

RELATION BETWEEN D1/D2 AND
CUT-OFF WAVELENGTH

RELATION BETWEEN Δ3 AND D2/D3

RELATION BETWEEN α AND DISPERSION SLOPE

RELATION BETWEEN α AND Aeff

WAVELENGTH CONVERTER

PULSE COMPRESSOR

OPTICAL FIBER HAVING HIGH NONLINEARITY

CROSS-REFERENCE TO RELATED APPLICATIONS

This application claims the benefit of priority of Japanese Patent Applications No. 2004-017179 filed on Jan. 26, 2004 and No. 2004-125001 filed on Apr. 21, 2004, and the disclosures of which are incorporated herein by its entirely.

BACKGROUND OF THE INVENTION

1) Field of the Invention

This invention relates to an optical fiber having a superior nonlinearity and an optical signal processor using the optical fiber.

2) Description of the Related Art

In recent years, demand has increased for the optical signal transmission higher in speed and capacity over a longer distance than ever before. This requires a signal processing technique for a high processing speed and long distance transmission of the optical signal. In one of the optical signal processing techniques, the optical signal is converted to an electrical signal, and the converted electrical signal is processed and restored again to the optical signal. The process of converting an optical signal to an electrical signal and converting the electrical signal again to an optical signal, however, is unsuitable for high speed signal processing.

In contrast, a full optical signal processing technique is available in which the optical signal is processed directly. In this processing technique, the optical signal is directly processed as it is without being converted to an electrical signal, and therefore a high-speed optical signal processing is made possible.

The full optical signal processing technique is implemented by a method utilizing the nonlinear optical phenomenon in the optical fiber for transmitting the optical signal or a method utilizing the nonlinear phenomenon in the optical waveguide made of a material having a high nonlinearity. The former method utilizing the nonlinear optical phenomenon in the optical fiber is now closely watched in, view of the fact that the high-speed processing is made possible while at the same time reducing the transmission loss. The nonlinear phenomena occurring in the optical fiber include the four-wave mixing, self-phase modulation, cross-phase modulation, Brillouin scattering, or the like. Of all of these phenomena, the wavelength conversion using the four-wave mixing, the waveform shaping and the pulse compression using the self-phase modulation have already been reported as an optical signal processing technique.

The four-wave mixing is a phenomenon in which the light of a new wavelength is generated according to a specified rule by the nonlinear phenomenon that occurs when the light of two or more wavelengths are input to the optical fiber. The optical signal processing technique described above is intended to utilize the phenomenon of generating the light of a new wavelength in wavelength conversion. The wavelength conversion utilizing the four-wave mixing has the advantage that many signals having various wavelengths can be collectively converted.

By utilizing the self-phase modulation and the cross-phase modulation, on the other hand, the waveform deteriorated in transmission is shaped and the long-distance transmission of the full optical signal processing is realized.

The application of these optical signal processing techniques including the wavelength conversion and the waveform shaping utilizing the nonlinear phenomena such as the four-wave mixing and the self-phase modulation in the optical fiber requires an optical fiber that has a large nonlinear phenomenon, namely that has a high nonlinearity.

The nonlinear constant is one index of the nonlinearity of the optical fiber. The nonlinear constant is expressed by formula (1) below.

$$\text{Nonlinear constant} = n_2/Aeff \qquad (1)$$

where $n_2$ is the nonlinear refractive index of the optical fiber, and $Aeff$ is the effective area of the optical fiber. The formula (1) indicates that to increase the nonlinear constant of the optical fiber, it is necessary either to increase the nonlinear refractive index $n_2$ or to reduce the effective area $Aeff$.

This is realized by a method in which the first core located at the central portion of the optical fiber is doped with a great amount of germanium to increase the nonlinear refractive index $n_2$ or a method in which the relative refractive index difference between the first core and the cladding is increased to reduce the $Aeff$. An increased relative refractive index difference between the first core and the cladding, however, would increase the dispersion slope and the cut-off wavelength is shifted to long wavelength side.

As a means for solving this problem, what is called the W-type refractive index profile is known in which a second core lower in refractive index than the cladding is arranged on the outer periphery of the first core to decrease the dispersion slope and shift the cut-off wavelength to short wavelength side.

This method is realized by the optical fiber proposed, for example, in Japanese Patent Application Laid-Open (JP-A) No. 2002-207136. In this optical fiber employing the W-type refractive index profile, the concentration of germanium doped in the first core is increased to increase the nonlinear refractive index $n_2$ and the relative refractive index difference between the first core and the cladding is increased to reduce the Aeff. This method can realize an optical fiber having a sufficiently short cut-off wavelength.

To make the W-type refractive index profile of the optical fiber, the refractive index of the second core located on the outer periphery of the first core is reduced by, for example, doping fluorine into the second core.

To obtain a satisfactory characteristic of the optical fiber having a high nonlinearity, however, the refractive index of the second core is required to be increased to negative side, which in turn makes it necessary to dope high-concentration fluorine into the second core.

In doping fluorine in a normal pressure environment, however, the refractive index can be reduced at most to about −0.7% in terms of relative refractive index difference with pure silica.

If the refractive index of the second core is to be reduced below this limit, the technique of doping fluorine in a high-pressure environment is required ("pure silica" is defined as pure silica glass doped with no dopant doped to change the refractive index). A very sophisticated technique is required to dope fluorine in a high-pressure environment and poses the problem that the production equipment is complicated and the production yield is deteriorated at the same time.

SUMMARY OF THE INVENTION

It is an object of the present invention to at least solve the problems in the conventional technology.

An optical fiber according to one aspect of the present invention includes a first core located in a central portion of the optical fiber and having a first refractive index; a second core located in an outer periphery of the first core and having a second refractive index lower than the first refractive index; a third core located in an outer periphery of the second core and having a third refractive index lower than the first refractive index and higher than the second refractive index; and a cladding located in an outer periphery of the third core and having a fourth refractive index lower than the third refractive index and higher than the second refractive index. An absolute value of dispersion at a wavelength of 1550 nm is equal to or less than 20 ps/nm/km. An effective area at the wavelength of 1550 nm is equal to or less than 15 µm². A nonlinear constant $n_2$/Aeff at the wavelength of 1550 nm is equal to or more than $25 \times 10^{-10}$/W.

An optical fiber according to another aspect of the present invention includes a first core located in a central portion of the optical fiber and having a first refractive index; a second core located in an outer periphery of the first core and having a second refractive index lower than the first refractive index; and a cladding located in an outer periphery of the second core and having a third refractive index lower than the first refractive index and higher than the second refractive index. An absolute value of dispersion at a wavelength of 1550 nm is equal to or less than 20 ps/nm/km. An effective area Aeff at the wavelength of 1550 nm is equal to or less than 15 µm². A nonlinear constant at the wavelength of 1550 nm is equal to or more than $25 \times 10^{-10}$/W. The cladding also is doped with germanium.

The other objects, features, and advantages of the present invention are specifically set forth in or will become apparent from the following detailed description of the invention when read in conjunction with the accompanying drawings.

DETAILED DESCRIPTION

Figure 1A:
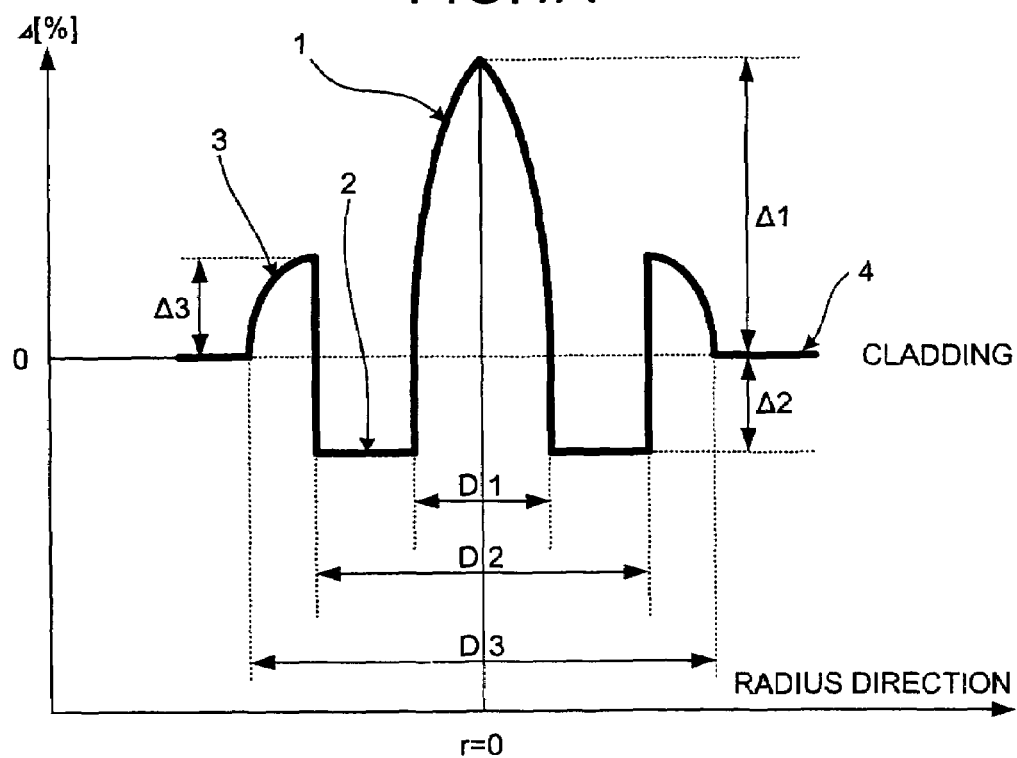
FIG. 1A is a diagram that depicts a typical example of the refractive index profile of a optical fiber according to a first embodiment of the invention.
Figure 1B:
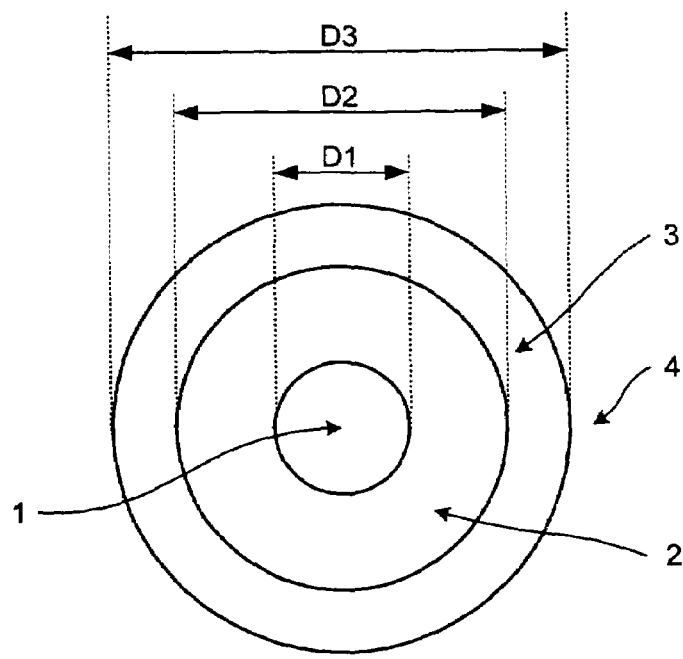
FIG. 1B is a cross sectional view of the same optical fiber.

FIG. 1A shows a typical example of the refractive index profile of the optical fiber according to a first embodiment of the invention, and FIG. 1B is a cross sectional view of the same optical fiber. As shown in FIGS. 1A and 1B, the optical fiber according to the first embodiment comprises a first core located at the central portion and having the α-profile, a second core arranged on the outer periphery of the first core and having a lower refractive index than the first core, a third core arranged on the outer periphery of the second core and having a lower refractive index than the first core and a higher refractive index than the second core, and a cladding arranged on the outer periphery of the third core and having a lower refractive index than the third core and a higher refractive index than the second core. Reference symbol D1 is the outer diameter of the first core located at the central portion, reference symbol D2 is the outer diameter of the second core arranged on the outer periphery of the first core, and reference symbol D3 is the outer diameter of the third core arranged on the outer periphery of the second core. The outer diameter D1 of the first core 1 is assumed to be the diameter of the position having a same refractive index of the cladding 4 at the border of the first core 1 and the second core 2. The outer diameter D2 of the second core 2 is assumed to be the diameter of the position having a ½ of relative refractive index difference of the relative refractive index difference Δ2, which is described below, at the border of the second core 2 and the third core 3, and the outer diameter D3 of the third core is assumed to be the diameter of the position having a ¹⁄₁₀ of relative refractive index difference of the relative refractive index difference Δ3, which is described below, at the border of the third core 3 and the cladding 4. The outer diameter D1 of the first core is 2 to 5 μm. The refractive index profile of the third core may be a stepped profile or an α-profile. Also, fourth and fifth cores or the like may be arranged on the outer periphery of the third core.

In FIG. 1A, Δ1 is the relative refractive index difference of the first core with respect to the cladding, Δ2 is the relative refractive index difference of the second core with respect to the cladding, and Δ3 is the relative refractive index difference of the third core with respect to the cladding. The values Δ1, Δ2 and Δ3 have the relation shown in equations (2) to (4) below.

$$\Delta 1 = \{(n_{c1} - n_c)/n_{c1}\} \cdot 100 \quad (2)$$

$$\Delta 2 = \{(n_{c2} - n_c)/n_{c2}\} \cdot 100 \quad (3)$$

$$\Delta 3 = \{(n_{c3} - n_c)/n_{c3}\} \cdot 100 \quad (4)$$

The α-value indicating the refractive index profile of the first core is defined by equation (5) on the assumption that the refractive index of the first core is $n^2(r)$ at the point of distance r ($0 \leq r \leq D1/2$) from the center.

$$n^2(r) = n_{c1}^2\{1 - 2 \cdot \Delta 1_n \cdot (2r/D1)^\alpha\} \quad (5)$$

In equations (2) to (5), $n_{c1}$ is the maximum refractive index of the first core, $n_{c2}$ is the minimum refractive index of the second core, and $n_{c3}$ is the maximum refractive index of the third core. In equation (5), $\Delta 1_n$ is the value of Δ1 not expressed in percent, and the relation holds that $\Delta 1_n = \{(n_{c1} - n_c)/n_{c1}\}$.

Generally, in the optical fiber comprising the first core located at the central portion, the second core arranged on the outer periphery of the first core and the cladding arranged on the outer periphery of the second core, the relative refractive index difference Δ2 (see equation (3)) of the second core with respect to the cladding, if increased to negative side, makes it possible to reduce the dispersion slope while at the same time decreasing the absolute value of the dispersion at the wavelength of 1550 nm. To reduce the dispersion slope even more, however, a third core arranged on the outer periphery of the second core and having a higher refractive index than the cladding is required. The reduction in the dispersion slope by the addition of the third core is explained below.

In the optical fiber having the refractive index profile shown in FIG. 1A, Δ3 is changed, and the change in the dispersion slope, the effective area Aeff and the cut-off wavelength are determined by simulation. The structural parameters other than Δ3 of the optical fiber used in the simulation are shown in Table 1.

TABLE 1

Structural parameters of optical fiber used in simulation (1)

| | Δ1 % | Δ2 % | D1/D2 | D2/D3 | α |
|---|---|---|---|---|---|
| OPTICAL FIBER A | 2.8 | −0.8 | 0.44 | 0.8 | 4 |
| OPTICAL FIBER B | 2.8 | −0.8 | 0.4 | 0.85 | 4 |

Figure 2:
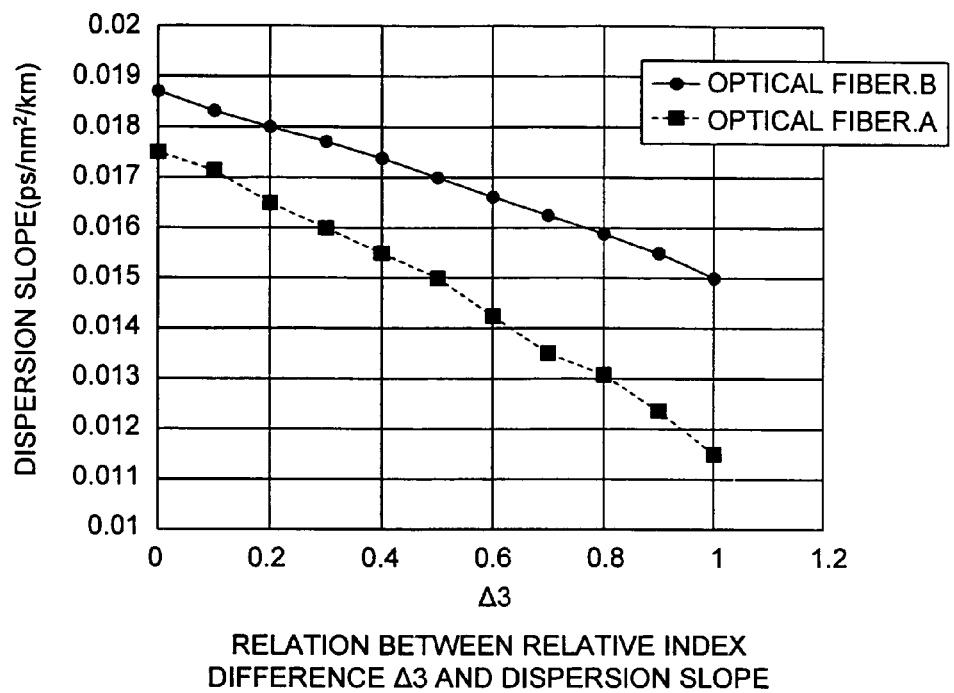
FIG. 2 is a diagram that depicts the relation between the relative refractive index difference Δ3 of the third core of the optical fiber and the dispersion slope having the structural parameters of Table 1.
Figure 3:
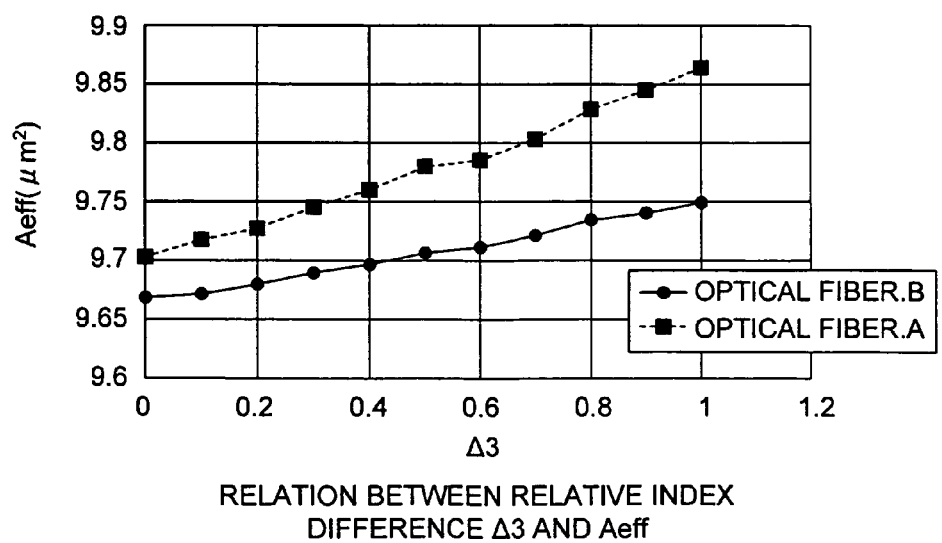
FIG. 3 is a diagram that depicts the relation between the relative refractive index difference Δ3 of the third core of the optical fiber and the effective area Aeff having the structural parameters of Table 1.
Figure 4:
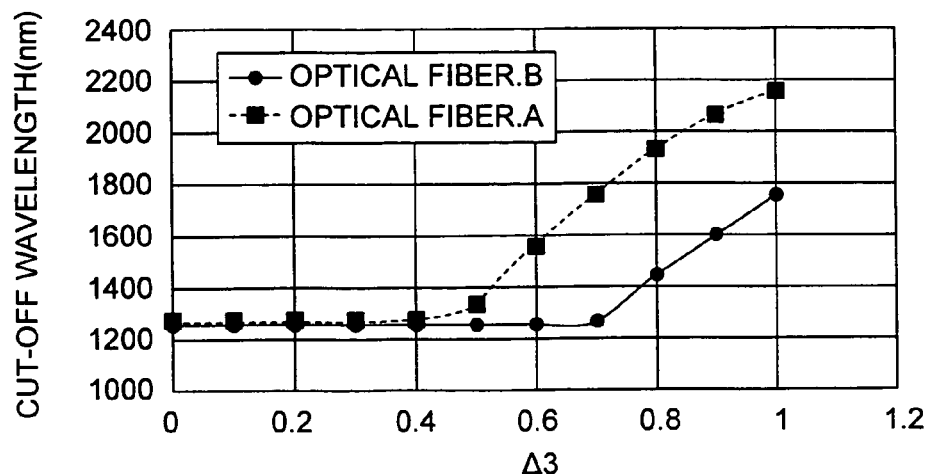
FIG. 4 is a diagram that depicts the relation between the relative refractive index difference Δ3 of the third core of the optical fiber and the cut-off wavelength having the structural parameters of Table 1.

FIG. 2 shows the relation between the relative refractive index difference Δ3 of the optical fiber having the structural parameters shown in Table 1 and the dispersion slope at the wavelength of 1550 nm. As shown in FIG. 2, an increased relative refractive index difference Δ3 decreases the dispersion slope. An increased relative refractive index difference Δ3, however, expands the effective area Aeff as shown in FIG. 3, resulting in a comparatively small nonlinearity. Further, as shown in FIG. 4, the cut-off wavelength is shifted to long wavelength side. The relative refractive index difference Δ3 and the diameter of the third core are thus required to be adjusted not to expand the effective area Aeff excessively and also not to increase the cut-off wavelength beyond 1500 nm. The adjustment is specifically described below.

Effective Area Aeff

As described above, it is understood from equation (1) that if the nonlinearity of the optical fiber is to be increased, the nonlinear refractive index $n_2$ is required to be increased or the effective area Aeff reduced. The value $n_2$, which is determined by the material, however, cannot be easily increased. It is more realistic, therefore, to reduce the value of the effective area Aeff of the optical fiber as far as possible. According to the first embodiment, the effective area Aeff of the optical fiber is determined as equal to or less than 15 μm², or more preferably equal to or less than 12 μm². As a result, an optical fiber having a larger nonlinear constant in which a nonlinear constant is equal to or more than $25 \times 10^{-10}$/W, or equal to or more than $40 \times 10^{-10}$/W is obtained at the wavelength of 1550 nm.

Relative Index Difference Δ1 and Δ2

The value Aeff can be most effectively reduced by increasing the relative refractive index difference Δ1. A simulation is carried out for calculation of the proper relative refractive index difference Δ1. Table 2 shows the structural parameters other than Δ1 of the optical fiber used for the simulation. The parameters Δ2 and Δ3 are similar to the corresponding ones described above, and equations (2) to (5) apply. The examples 2-2 and 2-3 have no third core.

TABLE 2

Structural parameters of optical fiber used in simulation (2)

| | Δ2 % | Δ3 % | D1/D3 | D2/D3 | α |
|---|---|---|---|---|---|
| EXAMPLE 2-1 | −1 | 0.40 | 0.55 | 0.82 | 4 |
| EXAMPLE 2-2 | −1 | — | 0.55 | — | 4 |
| EXAMPLE 2-3 | −0.55 | — | 0.5 | — | 3 |

Figure 5:
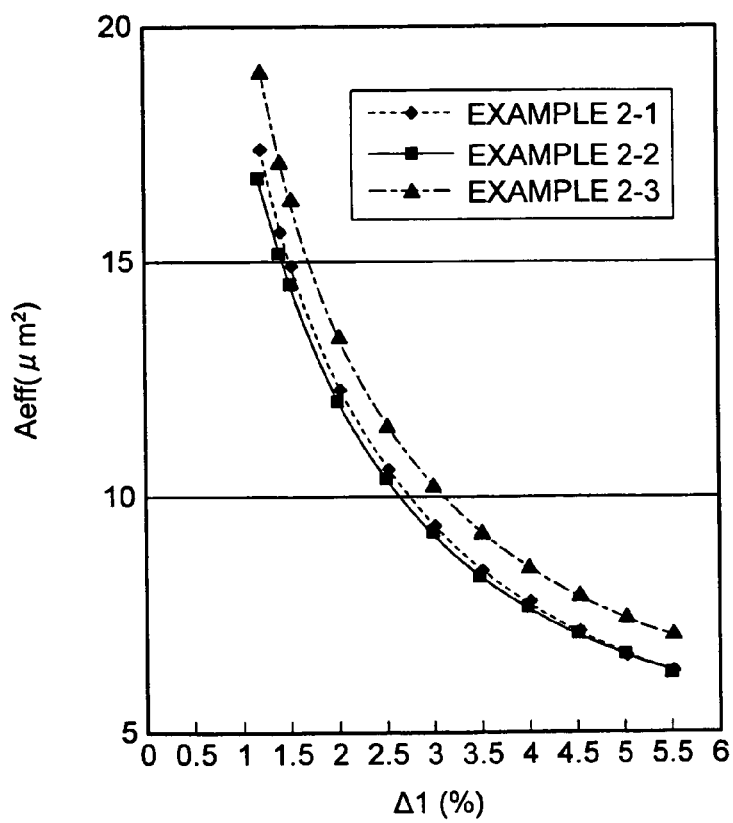
FIG. 5 is a diagram that depicts the relation between the relative refractive index difference Δ1 of the first core of the optical fiber and the effective area Aeff fiber having the structural parameters of Table 2.

FIG. 5 shows the relation between the relative refractive index difference Δ1 and the effective area Aeff of the optical fiber having the structural parameters shown in Table 2. As shown in FIG. 5, the effective area Aeff reduces with the increase in the relative refractive index difference Δ1. Also, comparison between the examples 2-1 and 2-2 having the same structural parameters, the only difference being the presence or absence of the third core, shows that the addition of the third core having a higher refractive index than the cladding somewhat widens the effective area Aeff. Also, for the relative refractive index difference Δ1 of less than 1.5%, the effective area Aeff is large and the nonlinearity is comparatively small. If the optical fiber including the third core is to have the effective area Aeff of equal to or less than 15 μm², therefore, at least the relative refractive index difference Δ1 is required to be equal to or more than 1.5%.

With the increase in relative refractive index difference Δ1, on the other hand, the cut-off wavelength shifts to long wavelength side. Once the relative refractive index difference Δ1 exceeds 5.0%, therefore, the great consideration paid for the cut-off wavelength to secure the single-mode operation of the optical fiber deteriorates the productivity. Further, a core having the relative refractive index difference Δ1 of more than 5.0% is actually very difficult to fabricate. Further, once the relative refractive index difference Δ1 exceeds 5.0%, the dispersion slope for 1550 nm increases, and in processing the optical signal, the dispersion greatly varies with different wavelengths in the neighborhood of 1550 nm. Therefore, the relative refractive index difference Δ1 is preferably between 1.5% and 5.0% inclusive.

The increase of the relative refractive index difference Δ2 to negative side makes it possible to reduce both the dispersion slope and the absolute value of the dispersion at 1550 nm at the same time, while the cut-off wavelength shifts to short wavelength side. As described above, the relative refractive index difference Δ1 of between 1.5% and 5.0% inclusive makes it possible to reduce the absolute value of the dispersion slope to equal to or less than 0.03 ps/nm²/km for the relative refractive index difference Δ2 of equal to or less than −0.1%, and to equal to or less than 0.01 ps/nm²/km for the relative refractive index difference Δ2 of equal to or less than −0.7%. Also, the cut-off wavelength can be reduced to equal to or less than 1500 nm. To decrease the relative refractive index difference Δ2 to equal to or less than −1.4%, on the other hand, it is required to dope a great amount of fluorine and therefore the fabrication becomes difficult. The relative refractive index difference Δ1, therefore, is preferably between −1.4% and −0.1% inclusive, or more preferably between −1.4% and −0.7% inclusive.

When the relative refractive index difference Δ1 is equal to or more than 2.4% and the relative refractive index difference Δ2 is between −1.4% and −0.7% inclusive, as shown by examples 2-1 and 2-2 in FIG. 5, the effective area Aeff can be reduced to equal to or less than 11 μm², and the nonlinear constant n₂/Aeff of equal to or more than 40×10⁻¹⁰/W can be obtained. Also, the addition of the third core having a higher refractive index than the cladding somewhat expands the effective area Aeff, though still equal to or less than 12 μm². In this case, the nonlinear constant n₂/Aeff of equal to or more than 35×10⁻¹⁰/W can be obtained. When the relative refractive index difference Δ1 is equal to or less than 4.0% and the relative refractive index difference Δ2 is between −1.4% and −0.7% inclusive, a sufficiently high nonlinearity and low dispersion slope are obtained, and an optical fiber having a cut-off wavelength of equal to or less than 1500 nm is realized. Further, the addition of the third core increases the freedom of the refractive index profile, which leads to an improved yield, a higher productivity and a higher stability. More preferably, therefore, the relative refractive index difference Δ1 is set to between 2.4% and 4.0% inclusive and the relative refractive index difference Δ2 to between −1.4% and −0.7% inclusive.

Dispersion and Dispersion Slope

The optical fiber according to the invention can be used over a wide wavelength range including 1550 nm, and is required to have a small absolute value of dispersion over the entire range of the operating wavelength. The optical fiber according to the first embodiment, therefore, preferably has the absolute value of dispersion at equal to or less than 10 ps/nm/km or more preferably equal to or less than 5 ps/nm/km at the wavelength of 1550 nm.

The difference of dispersion over the entire range of the operating wavelength is also required to be small. The absolute value of the dispersion slope at the wavelength of 1550 nm of the optical fiber according to the first embodiment is equal to or less than 0.03 ps/nm²/km or more preferably equal to or less than 0.01 ps/nm²/km. As a result, the optical fiber according to the first embodiment has a small dispersion difference in the all range of the operating wavelength and a single optical fiber can process the optical signal of various wavelengths in a wide wavelength range. Thus, a superior optical signal processing utilizing the nonlinear optical phenomenon over a wide wavelength range becomes possible.

The small dispersion difference is guaranteed over the entire length of the optical fiber according to the first embodiment as long as 1 km to several km. As a result, the optical fiber according to the first embodiment can be effectively used for the wavelength converter, the pulse compressor or the like optical signal processor utilizing the optical nonlinearity. In the optical fiber according to the first embodiment, therefore, the difference between maximum and minimum values of dispersion in the longitudinal direction of the optical fiber at any wavelength between 1510 nm to 1590 nm is equal to or less than 1 ps/nm/km or preferably equal to or less than 0.2 ps/nm/km. This small dispersion difference makes possible a very effective application to the optical signal processor such as the wavelength converter or the pulse compressor utilizing the optical nonlinear phenomenon. The "dispersion difference" is defined as the one measured by the dispersion distribution measuring instrument over the whole length of the optical fiber having the practical length. The dispersion distribution of the optical fiber can be measured by the dispersion distribution measuring instrument utilizing, for example, the method studied by Mollenauer.

In actually suppressing the variation of dispersion along the length of the optical fiber, the thickness of the cores and the cladding of the optical fiber preform is required to be uniform. Specifically, in the stage of synthesizing the soot by outside vapor deposition(OVD) or vapor-phase axial deposition(VAD), for example, the material deposited is required to control to a uniform thickness. In elongating the optical fiber preform to the desired outer diameter, the accuracy as high as to attain the outer diameter variation of equal to or less than 0.2% is required. Also in drawing the optical fiber from the optical fiber preform, a substantially constant diameter is required to be maintained to keep the outer diameter variation of the optical fiber at equal to or less than 0.2%.

Cut-off Wavelength

In the single-mode optical fiber, the required cut-off wavelength λc is considered smaller than the actual operating wavelength. Thus, the cut-off wavelength λc is preferably equal to or less than 1500 nm or more preferably equal to or less than 1460 nm. The cut-off wavelength λc of equal to or less than 1500 nm makes the optical fiber applicable in a wide wavelength range of equal to or more than 1500 nm. Further, the cut-off wavelength λc of equal to or less than 1460 nm makes the optical fiber applicable over a wide wavelength range including the S band (1460 nm to 1530 nm), C band (1530 nm to 1565 nm) and L band (1565 nm to 1625 nm).

The "cut-off wavelength λc" is defined as fiber cut-off wavelength λc in ITU-T (International Telecommunication Union) G.650. Also, unless otherwise specifically defined herein, all the terms are used as defined and the measurement method followed as specified in ITU-T G.650.

Ratio D1/D2 Between Outer Diameter of First Core and Outer Diameter of Second Core By adjusting the ratio D1/D2 between the outer diameter D1 of the first core and the outer diameter D2 of the second core, an optical fiber can be obtained in which the effective area Aeff is small, the cut-off wavelength λc is short and the dispersion slope is small. The change in dispersion slope with the adjustment of the ratio D1/D2 is explained below with reference to a simulation.

Table 3 shows the structural parameters of other than D1/D2 of the optical fiber used in a simulation. The relative refractive index differences Δ1, Δ2, or the like are similar to those described above and equations (2) to (5) apply.

TABLE 3

Structural parameters of optical fiber used in simulation (3)

| | Δ1 % | Δ2 % | Δ3 % | D2/D3 | α |
|---|---|---|---|---|---|
| EXAMPLE 3 | 3 | −1 | 0.4 | 0.8 | 5 |

Figure 6:
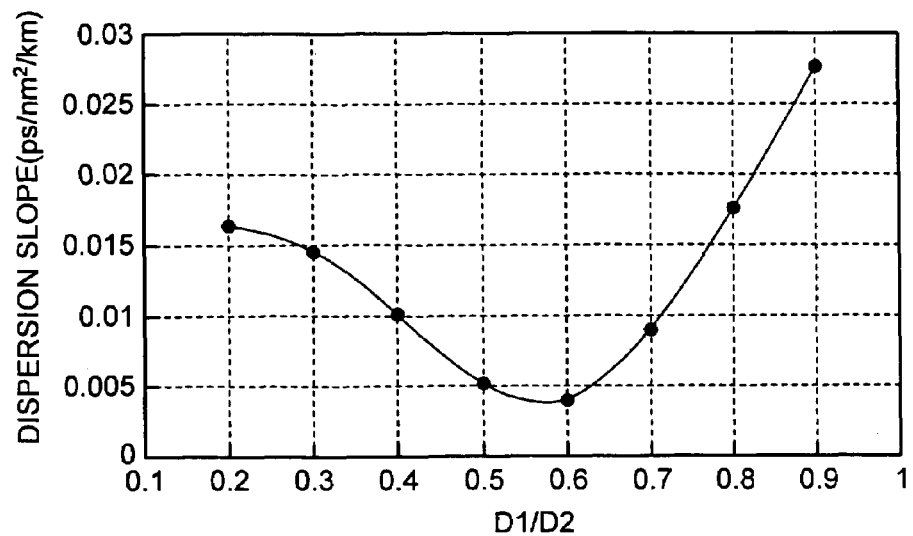
FIG. 6 is a diagram that depicts the relation between the ratio D1/D2 and the dispersion slope of the optical fiber having the structural parameters of Table 3, where D1 is the outer diameter of the first core and D2 is the outer diameter of the second core.
Figure 7:
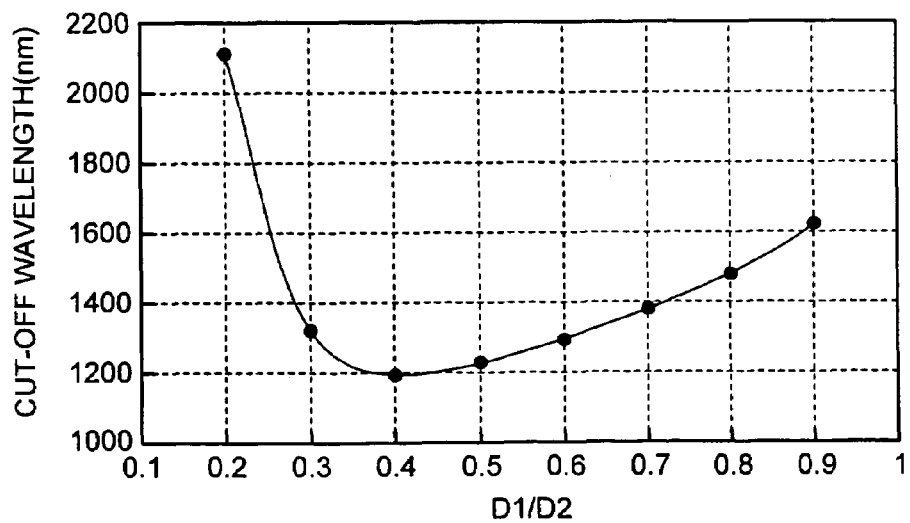
FIG. 7 is a diagram that depicts the relation between the ratio D1/D2 and the cut-off wavelength of the optical fiber having the structural parameters of Table 3, where D1 is the outer diameter of the first core and D2 is the outer diameter of the second core.

FIG. 6 shows the relation between the ratio D1/D2 and the dispersion slope for the dispersion of 0 ps/nm/km with the wavelength of 1550 nm of the optical fiber having the structural parameters shown in Table 3, and FIG. 7 shows the relation between the ratio D1/D2 and the cut-off wavelength for the dispersion of 0 ps/nm/km with the wavelength of 1550 nm of the optical fiber having the structural parameters shown in Table 3.

It is noted from FIG. 6 that with the approach of D1/D2 to 0 or 1, the dispersion slope is increased. To reduce the dispersion slope, therefore, the ratio D1/D2 is required to be set to about 0.5 between 0 and 1. Also, as shown in FIG. 7, with the decrease of D1/D2 to less than 0.3, the cut-off wavelength sharply shifts to long wavelength side and exceeds 1500 nm. With the increase of D1/D2 to more than 0.8, on the other hand, the cut-off wavelength, though gradually, exceeds 1500 nm. The proper ratio D1/D2, therefore, is between 0.3 and 0.8 inclusive.

Further, by setting the range of D1/D2 to between 0.4 and 0.7 inclusive, the absolute value of the dispersion slope can be reduced to equal to or less than 0.01 ps/nm²/km. Thus, the ratio D1/D2 is desirably between 0.4 and 0.7 inclusive.

Relative Refractive Index Difference Δ3 and Outer Diameter D3 of Third Core

To secure the cut-off wavelength of equal to or less than 1500 nm, the relative refractive index difference Δ3 and the outer diameter D3 of the third core are required to be adjusted. For this purpose, the structural parameters are changed between 1.5% and 5.0% inclusive for the relative refractive index difference Δ1, between −1.4% and −0.1% inclusive for the relative refractive index difference Δ2 and between 0.3 and 0.8 for the ratio D1/D2 between the outer diameter D1 of the first core and the outer diameter D2 of the second core. Under these conditions, the relative refractive index difference Δ3 is changed, thereby determining, by simulation, the range of D2/D3 in which the cut-off wavelength is 1500 nm or less for the dispersion of between −10 ps/nm/km and 10 ps/nm/km. The result of this simulation is shown in FIG. 8.

Figure 8:
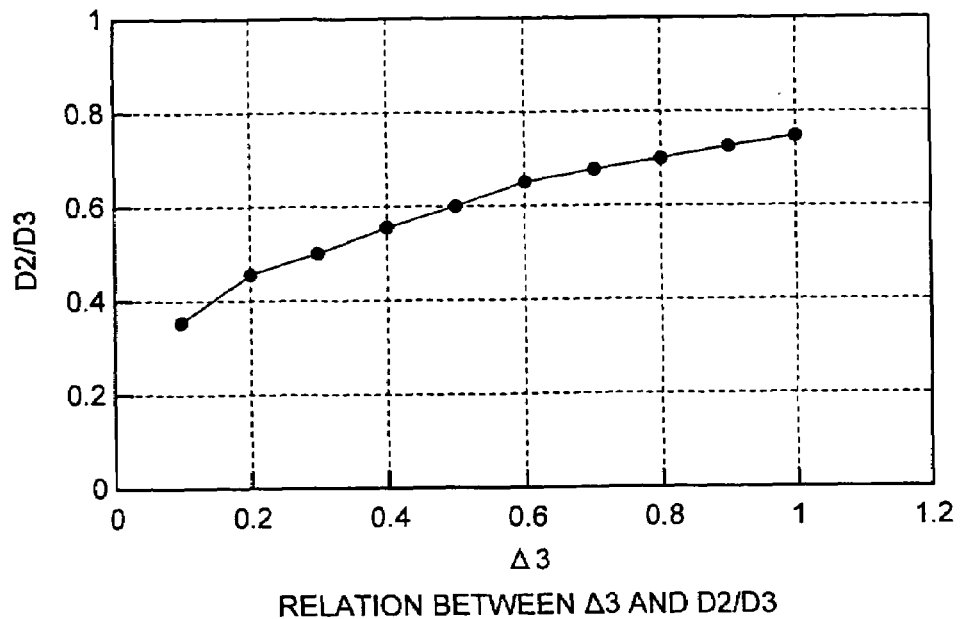
FIG. 8 is a diagram that depicts the range in which the cut-off wavelength remains equal to or less than 1500 nm and the dispersion of −10 to 10 ps/nm/km while changing the relative refractive index difference Δ3 of the third core and the ratio D2/D3 with a predetermined relative refractive index difference Δ1 of the first core, a predetermined relative refractive index difference Δ2 of the second core and a predetermined ratio D1/D2.

FIG. 8 is a diagram in which the ratio D2/D3 is progressively reduced (namely the width of the third core is progressively expanded) for the relative refractive index difference Δ3 of between 0.1% and 1.0% inclusive, and the ratio D2/D3 is plotted with the cut-off wavelength exceeding 1500 mn for the dispersion of between −10 ps/nm/km and 10 ps/nm/km inclusive. In the range of D2/D3 larger (the width of the third core is smaller) than the line plotted in FIG. 8 for each relative refractive index difference Δ3, therefore, the cut-off wavelength of equal to or less than 1500 nm is guaranteed. From FIG. 8, the range of D2/D3 shown in equation (6) is obtained.

$$D2/D3 > \Delta 3 + 0.25 \quad (0.1\% \leq \Delta 3 \leq 0.2\%)$$

$$D2/D3 > (\tfrac{1}{2}) \cdot \Delta 3 + 0.35 \quad (0.2\% \leq \Delta 3 \leq 0.6\%) \qquad (6)$$

$$D2/D3 > (\tfrac{1}{4}) \cdot \Delta 3 + 0.5 \quad (0.6\% \leq \Delta 3 \leq 1.0\%).$$

Refractive Index Profile of First Core

The refractive index profile of the first core is assumed to be the α-profile. With the increase in α-value, both the dispersion slope and the effective area Aeff can be reduced. A larger α-value is advantageous as explained below with reference to an example of simulation.

Table 4 shows the structural parameters of other than α-value of the optical fiber used in the simulation for explaining that a large α-value is advantageous. The values Δ1 and Δ2 are similar to those described above and equations (2) to (5) apply.

TABLE 4

Structural parameters of optical fiber used in simulation (4)

| | Δ1 % | Δ2 % | Δ3 % | D1/D2 | D2/D3 |
|---|---|---|---|---|---|
| OPTICAL FIBER C | 2.6 | −0.8 | 0.3 | 0.4 | 0.8 |
| OPTICAL FIBER D | 3 | −1 | 0.3 | 0.4 | 0.7 |

Figure 9:
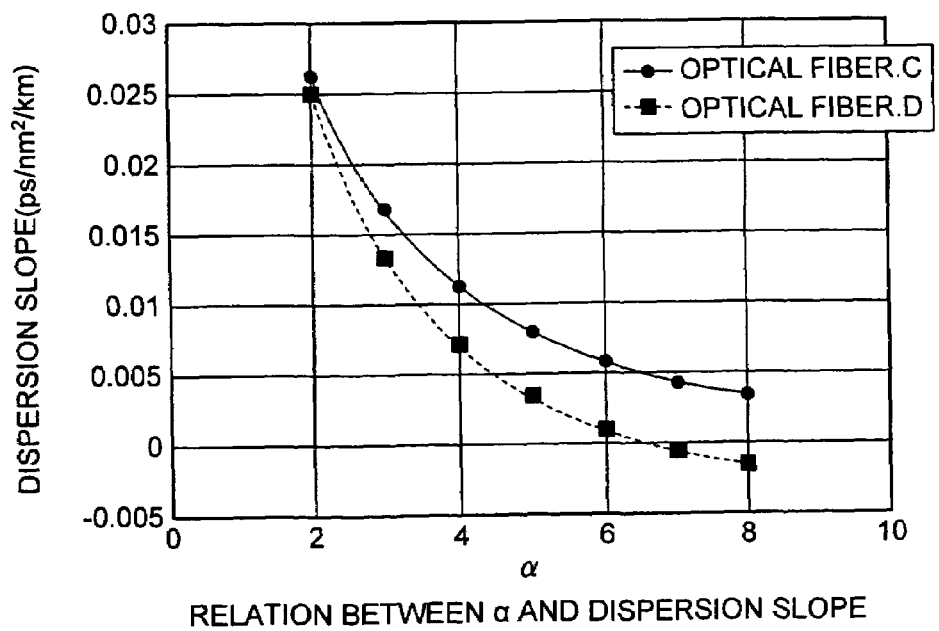
FIG. 9 is a diagram that depicts the relation between the dispersion slope and the α-value indicating the refractive index profile of the first core of the optical fiber having the structural parameters of Table 4.
Figure 10:
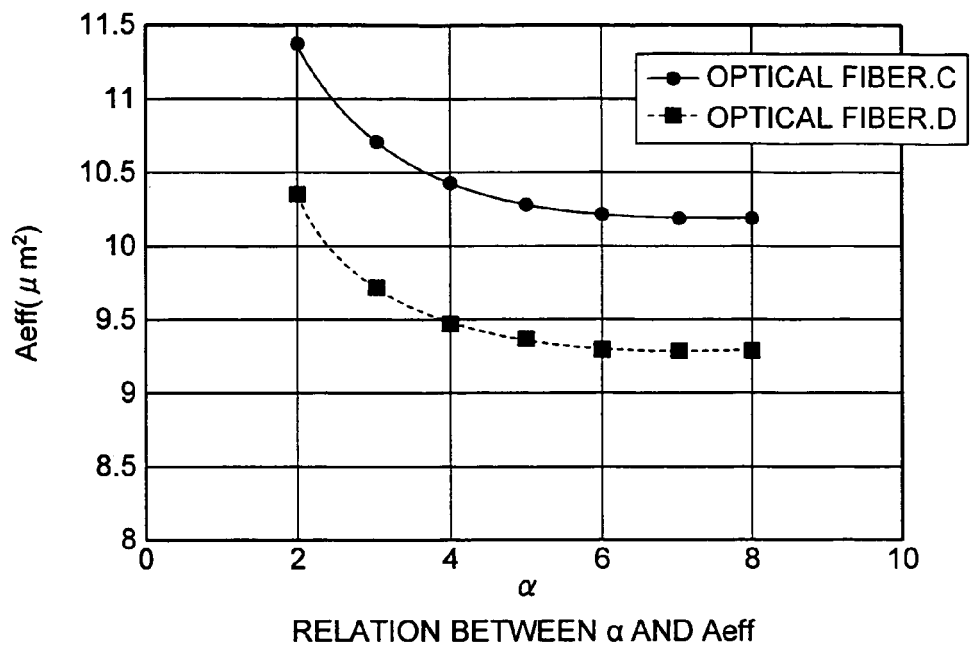
FIG. 10 is a diagram that depicts the relation between the effective area Aeff and the α-value indicating the refractive index profile of the first core of the optical fiber having the structural parameters of Table 4.

FIG. 9 shows the relation between the α-value of the first core and the dispersion slope of the optical fiber having the structural parameters specified in Table 4, and FIG. 10 shows the relation between the α-value and the effective area Aeff of the optical fiber having the structural parameters specified in Table 4. As shown in FIG. 9, with the increase in α-value, the dispersion slope can be reduced. Especially with the increase of α-value from 2 to 3, the dispersion slope can be reduced by about 0.0095 ps/nm²/km for the optical fiber C and by about 0.012 ps/nm²/km for the optical fiber D. In this way, an increased of α-value very effectively and the effective area Aeff is equal to or less than 15 μm². To facilitate comparison, substantially the same dispersion value at the wavelength of 1550 nm is set in the examples 1 to 8 and the comparative examples 1 and 2.

TABLE 5

| MEASURING WAVELENGTH | Δ1 % | Δ2 % | Δ3 % | D1/D2 | D2/D3 | α | DISPERSION ps/nm/km 1550 nm | SLOPE ps/nm²/km 1550 nm | MFD μm 1550 nm | Aeff μm² 1550 nm | CUT-OFF nm | $n_2$/Aeff $10^{-10}$/W 1550 nm |
|---|---|---|---|---|---|---|---|---|---|---|---|---|
| EXAMPLE 1 | 3 | −1 | 0.3 | 0.0375 | 0.8 | 3 | −1 | 0.0213 | 3.41 | 9.03 | 1209 | 60.9 |
| EXAMPLE 2 | 3 | −1 | 0.3 | 0.0375 | 0.8 | 6 | −1 | 0.0093 | 3.29 | 8.56 | 1230 | 64.3 |
| EXAMPLE 3 | 3 | −1 | 0.5 | 0.0375 | 0.8 | 3 | −1 | 0.0209 | 3.41 | 9.04 | 1429 | 60.8 |
| EXAMPLE 4 | 3 | −1 | 0.3 | 0.0375 | 0.75 | 3 | −1 | 0.0211 | 3.41 | 9.04 | 1316 | 60.8 |
| EXAMPLE 5 | 3 | −1 | 0.3 | 0.5 | 0.8 | 3 | −1 | 0.0144 | 3.45 | 9.28 | 1249 | 59.3 |
| EXAMPLE 6 | 3 | −1 | 0.3 | 0.5 | 0.8 | 6 | −1 | 0.0013 | 3.35 | 8.88 | 1280 | 62 |
| EXAMPLE 7 | 3 | −1 | 0.5 | 0.5 | 0.8 | 6 | −1 | −0.0002 | 3.35 | 8.93 | 1291 | 61.6 |
| EXAMPLE 8 | 3 | −1 | 0.7 | 0.5 | 0.8 | 4 | −1 | 0.005 | 3.41 | 9.15 | 1407 | 60.1 |
| COMPARATIVE EXAMPLE 1 | 3 | −1 |  | 0.0375 |  | 3 | −1 | 0.0217 | 3.41 | 9.02 | 1208 | 61 |
| COMPARATIVE EXAMPLE 2 | 3 | −1 |  | 0.5 |  | 3 | −1 | 0.0161 | 3.44 | 9.22 | 1238 | 59.6 | reduces the dispersion slope. Also, as shown in FIG. 10, the increase in α-value can reduce the effective area Aeff. Especially with the increase of α-value from 2 to 3, the effective area Aeff can be reduced by as much as about 10% for both the optical fibers C and D.

To increase the α-value of the first core, a core preform having a large α-profile of the refractive index profile is produced by VAD or modified chemical vapor deposition (MCVD). Alternatively, the surface of the core preform produced by these methods is cut by HF etching or mechanically ground. The α-value can be increased by these methods with comparative ease in the manufacturing process. Also, as shown in FIG. 9, with a further increase in α-value to 6 or more, the dispersion slope can be further reduced. By further increasing α-value as shown in FIG. 10, the effective area Aeff can be reduced. For the α-value of 6 or more, the downward tendency of the dispersion slope continues as shown in FIG. 9, while the downward tendency of the Aeff substantially saturates as shown in FIG. 10. Therefore, the α-value is preferably equal to or more than 6.

EXAMPLE OF OPTICAL FIBER ACCORDING TO FIRST EMBODIMENT

Table 5 shows the structural parameters of each optical fiber and the characteristic values obtained by simulation according to the examples 1 to 8 of the first embodiment and the comparative examples 1 and 2. In Table 5, MFD designates the mode field diameter. In this simulation, the refractive index of the cladding is set substantially the same as that of pure silica glass. In all the examples 1 to 8, the absolute value of dispersion is equal to or less than 10 ps/nm/km and the absolute value of dispersion slope is equal to or less than 0.03 ps/nm²/km at the wavelength of 1550 nm. Also, the cut-off wavelength λc is equal to or shorter than 1500 nm Comparison between the examples 1 and 2 shows that the refractive index profile of the first core is the α-profile and α-value is 3 in the example 1, while α-value is 6 in the example 2. Comparison of the characteristic values between the optical fibers shows, on the other hand, that the dispersion slope at the wavelength of 1550 nm is smaller for the example 2 than for the example 1. This is also the case with the effective area Aeff. The same can be said of the relation between the examples 5 and 6. This indicates that α-value is more preferably equal to or more than 6.0 than equal to or more than 3.0.

The relative refractive index difference Δ3 of the optical fiber is 0.3% for the example 1 and 0.5% for the example 3. Comparison of the characteristic values between the optical fibers shows, on the other hand, that the absolute value of dispersion slope at the wavelength of 1550 nm is smaller for the example 3 than for the example 1, while the effective area Aeff is larger for the example 3. This is also the case with the relation between the examples 6 and 7. From the comparison between the relation of example 1 and 3 and relation of example 6 and 7, it is understood that since D1/D2 is larger (namely the distance is shorter between the first and third cores), the characteristics values are more sensitive to the change in the relative refractive index difference Δ3 of the third core.

The ratio D1/D2 between the outer diameter D1 of the first core 1 and the outer diameter D2 of the second core 2 is 0.375 for the optical fiber of the example 1, while the ratio D1/D2 is 0.5 for the example 5. Comparison of the characteristics values obtained for these two optical fibers shows that the effective area Aeff is larger for the example 5 than for the example 1. In the embodiment 5, therefore, the cut-off wavelength λc is shifted to long wavelength side, while the absolute value of dispersion slope at the wavelength of 1550 nm is assumed as a considerably small value.

In other words, from the viewpoint of the dispersion slope,: the indication is that the ratio D1/D2 is more preferably between 0.4 and 0.7 inclusive than between 0.3 and 0.8 inclusive.

The comparative example 1 represents a structure of the example 1 having no third core, and the comparative example 2 a structure of the example 5 having no third core. Comparison of the characteristics values obtained for these two optical fibers shows that the effective area Aeff is larger for the example 1 than for the comparative 1, and the absolute value of dispersion slope at the wavelength of 1550 nm is smaller for the example 1. Also, the effective area Aeff is larger for the example 5 than for the comparative example 2, and the absolute value of dispersion slope at the wavelength of 1550 nm is smaller for the example 5. In other words, from the viewpoint of reducing the dispersion slope, the third core is more advantageously provided as in the first embodiment.

Table 6 shows the structural parameters and the characteristic values of the optical fiber including the various relative refractive index difference Δ1 of the first core and the relative refractive index difference Δ2 of the second core in the examples 9 to 18 of the first embodiment. The characteristic values shown in the examples 9 to 16 are obtained by simulation, while the characteristic values in the examples 17 and 18 are obtained by evaluation of the optical fiber actually produced. The characteristic values of the optical fiber actually produced are substantially the same as those obtained by simulation. In all of the examples 9 to 18, the absolute value of dispersion at the wavelength of 1550 nm is equal to or less than 10 ps/nm/km, and the absolute value of dispersion slope is equal to or less than 0.03 ps/nm²/km. Also, the cut-off wavelength λc is equal to or shorter than 1500 nm and the effective area Aeff is equal to or less than 15 μm².

The optical signal processing having a stable performance in a wide wavelength range is secured by the optical signal processor using the optical fiber according to the first embodiment.

Figure 11:
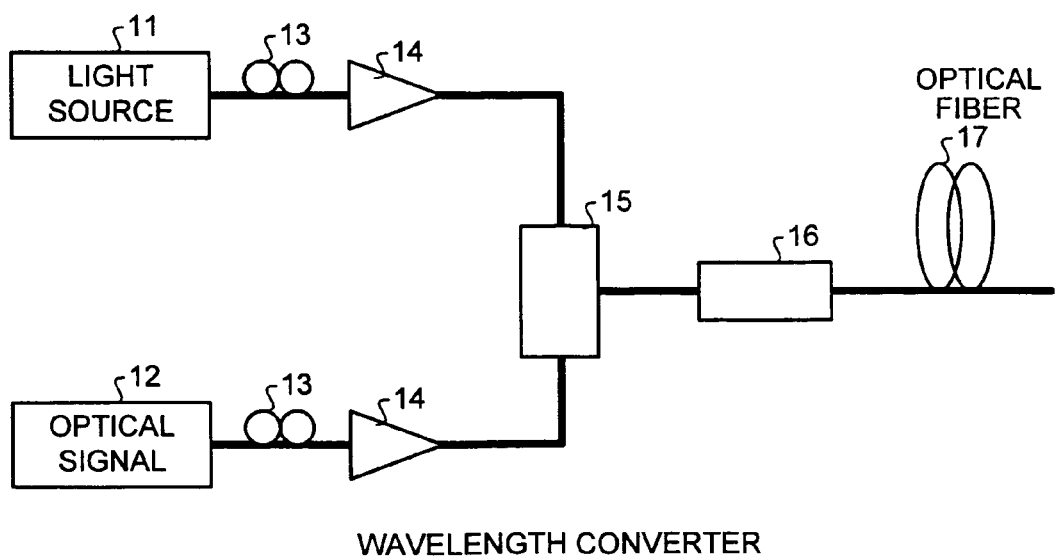
FIG. 11 is a diagram that depicts an example of the optical wavelength converter using the optical fiber according to this invention.

FIG. 11 shows an optical wavelength converter for converting the wavelengths of an optical signal collectively into other wavelengths as an example of the optical signal processor using the optical fiber according to the first embodiment. The optical wavelength converter shown in FIG. 11 includes a polarization mode controller 13 for keeping the direction of the polarization mode, an erbium doped optical fiber amplifier (EDFA) 14, a coupler 15 for coupling the pumping light (wavelength λs) from the light source with the optical signal 12 and a polarizer 16. The optical wavelength converter shown in FIG. 11 is briefly described below.

The zero dispersion wavelength of the optical fiber according to the first embodiment is checked in advance, and the pumping light (wavelength λs) in the neighborhood of the zero dispersion wavelength is generated from the light source 11. This signal, after being coupled with the optical signal 12 (wavelength λp), is input to the optical fiber 17 according to the first embodiment. In the process, a nonlinear phenomenon called the four-wave mixing occurs in the optical fiber 17, so that the optical signal 12 is converted to the wavelength λ shown in equation (7). As a result, the collective optical wavelength conversion is effected.

$$\lambda = (\lambda p - \lambda s) + \lambda p \qquad (7)$$

Figure 12:
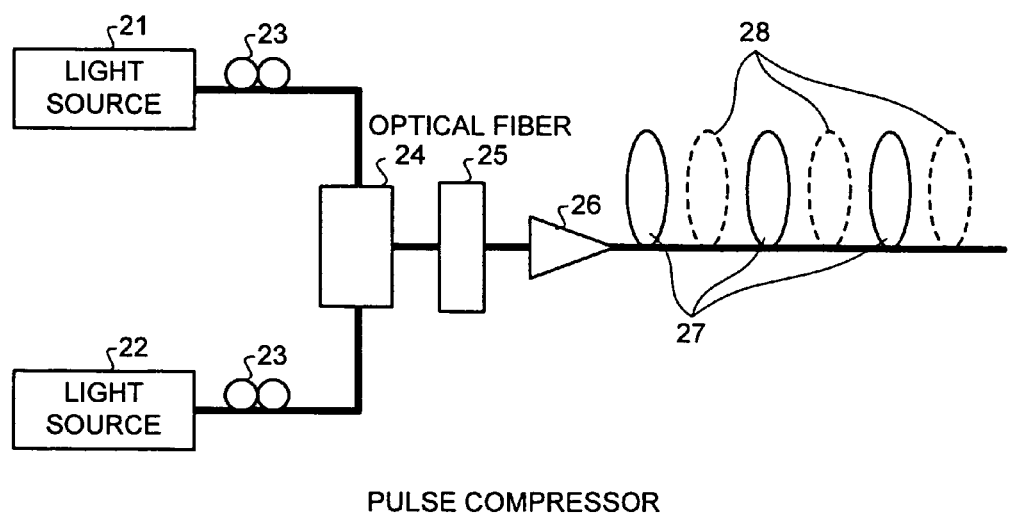
FIG. 12 is a diagram that depicts an example of the pulse compressor using the optical fiber according to this invention.

FIG. 12 shows an example of the pulse compressor using the optical fiber according to the first embodiment. The pulse compressor shown in FIG. 12 includes light sources 21, 22 of different wavelengths, a polarization mode controller 23, a coupler 24, a polarizer 25, an EDFA 26, a conventional single-mode optical fiber 28 and an optical fiber 27 accord-

TABLE 6

| | Δ1 % | Δ2 % | Δ3 % | D1/D2 | D2/D3 | α | DISPERSION ps/nm/km | SLOPE ps/nm²/km | MFD μm | Aeff μm² | CUT-OFF nm | n₂/Aeff 10⁻¹⁰/W |
|---|---|---|---|---|---|---|---|---|---|---|---|---|
| EXAMPLE 9 | 1.5 | −0.7 | 0.2 | 0.33 | 0.9 | 6 | 0 | 0.0123 | 4.26 | 14.04 | 994 | 27 |
| EXAMPLE 10 | 2 | −0.3 | 0.2 | 0.5 | 0.85 | 4 | −3 | 0.018 | 4.24 | 13.79 | 1236 | 32 |
| EXAMPLE 11 | 2.5 | −0.5 | 0.4 | 0.625 | 0.8 | 5 | −2 | 0.012 | 3.87 | 11.73 | 1416 | 40.6 |
| EXAMPLE 12 | 2.8 | −1 | 0.4 | 0.5 | 0.8 | 5 | 0 | 0.0036 | 3.46 | 9.45 | 1258 | 52.9 |
| EXAMPLE 13 | 2.9 | −0.8 | 0.3 | 0.57 | 0.7 | 5 | 3.8 | 0.0149 | 3.6 | 10.28 | 1442 | 48.6 |
| EXAMPLE 14 | 3.4 | −0.9 | 0.4 | 0.375 | 0.8 | 5.5 | 1 | 0.0155 | 3.23 | 8.25 | 1336 | 72.7 |
| EXAMPLE 15 | 4 | −1.2 | 0.5 | 0.55 | 0.9 | 6 | −1 | 0.005 | 2.96 | 6.99 | 1347 | 93 |
| EXAMPLE 16 | 4.8 | −1.4 | 0.5 | 0.47 | 0.85 | 5.5 | −1 | 0.0046 | 2.77 | 6.12 | 1415 | 115 |
| EXAMPLE 17 | 2.89 | −1 | 0.6 | 0.6 | 0.67 | 7 | −3.9 | −0.0125 | 3.52 | 9.72 | 1388 | 49.6 |
| EXAMPLE 18 | 2.89 | −1 | 0.6 | 0.58 | 0.69 | 7 | −0.769 | −0.0058 | 3.56 | 9.9 | 1400 | 53.1 |

The variation of dispersion is measured in the longitudinal direction of the optical fiber according to the examples 17 and 18. The result shows that in the example 17, the difference between maximum and minimum values of dispersion along the longitudinal direction of the optical fiber of 1 km length is 0.8 ps/nm/km at the wavelength of 1552 nm. In the optical fiber shown in the example 18, on the other hand, the difference between maximum and minimum values of dispersion along the longitudinal direction of the optical fiber of 1 km length is 0.2 ps/nm/km at the wavelength of 1554 nm. The optical fiber according to the present invention most commonly used is about 400 m to 1 km length, and the difference between maximum and minimum values of longitudinal dispersions of both optical fibers are within the tolerable range.

ing to the first embodiment. In the pulse compressor shown in FIG. 13, the optical fiber 27 according to the first embodiment and the conventional single-mode optical fiber 28 are connected alternately at predetermined intervals.

FIGS. 11 and 12 show only the optical wavelength converter and the pulse compressor as an optical signal processor using the optical fiber according to the first embodiment. Nevertheless, other optical signal processors such as a waveform shaper can of course be employed with the optical fiber according to the first embodiment.

The optical fiber according to the second embodiment and the optical wavelength converter and the pulse compressor using the optical fiber are explained with reference to FIGS. 13 to 19.

Figure 13A:
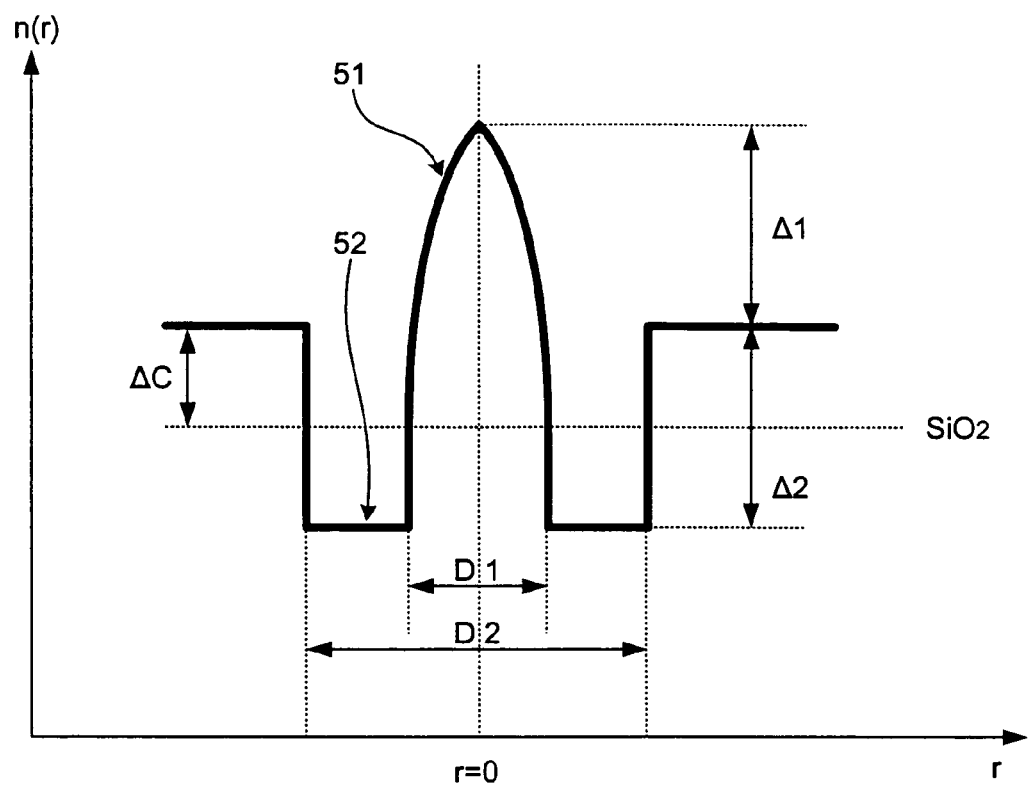
FIG. 13A shows the refractive index profile of the optical fiber according to a second embodiment of the invention.
Figure 13B:
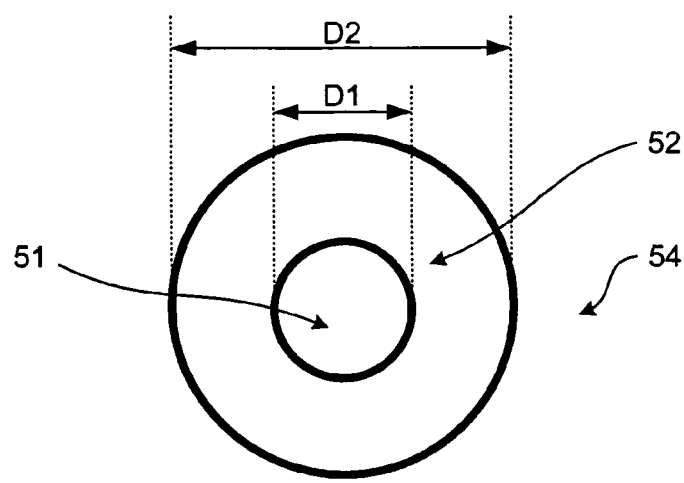
FIG. 13B is a cross sectional view of the same optical fiber.

FIGS. 13A, 13B show an example of the optical fiber according to the second embodiment. FIG. 13A shows the refractive index profile of the optical fiber, and FIG. 13B shows a part of the cross section thereof. The outer line of the cladding 54 is not shown.

As shown in FIG. 13A, this optical fiber having what is called the W-type refractive index profile includes a first core 51 located at the central portion and having the α refractive index profile shown in equation (8), a second core 52 arranged on the outside of the first core 51 and having a lower refractive index than the first core 51, and a cladding 54 arranged on the outside of the second core 52 and having a higher refractive index than the second core 52. Also, the refractive index of the cladding 54 is higher than that of the pure silica glass indicated by the dotted line in FIG. 13A.

The α-value indicating the refractive index profile of the first core is defined by equation (8) below.

$$n^2(r) = n_{c1}^2 \{1 - 2 \cdot (\Delta 1/100) \cdot (2r/D1)^\alpha\} \tag{8}$$

where $0 < r < D1/2$, character r indicates the position in radial direction from the center of the optical fiber, and $n(r)$ indicates the refractive index at the position r. Also, $n_{c1}$ indicates the maximum refractive index of the first core 51, and D1 the diameter of the first core 51.

The relative refractive index difference $\Delta 1$ of the first core 51 with respect to the cladding 54, the relative refractive index difference $\Delta 2$ of the second core 52 with respect to the cladding 54 and the relative refractive index difference $\Delta C$ of the cladding with respect to the pure silica glass are expressed by equations (9) to (11) below.

$$\Delta 1 = \{(n_{c1} - n_c)/n_{c1}\} \cdot 100 \tag{9}$$

$$\Delta 2 = \{(n_{c2} - n_c)/n_{c2}\} \cdot 100 \tag{10}$$

$$\Delta C = \{(n_c - n_s)/n_c\} \cdot 100 \tag{11}$$

where $n_{c1}$ is the maximum refractive index of the first core 51, $n_{c2}$ is the minimum refractive index of the second core 52, $n_c$ is the refractive index of the cladding 54, and $n_s$ is the refractive index of the pure silica glass.

According to the second embodiment, the diameter D1 of the first core 51 is assumed to be the diameter of the position having a same refractive index of the cladding 54 at the border of the first core 1 and the second core 2, and the diameter D2 of the second core 52 is assumed to be the diameter of the position having a ½ of relative refractive index difference of $\Delta 2$ at the border of the second core 52 and the cladding 54.

Figure 14A:
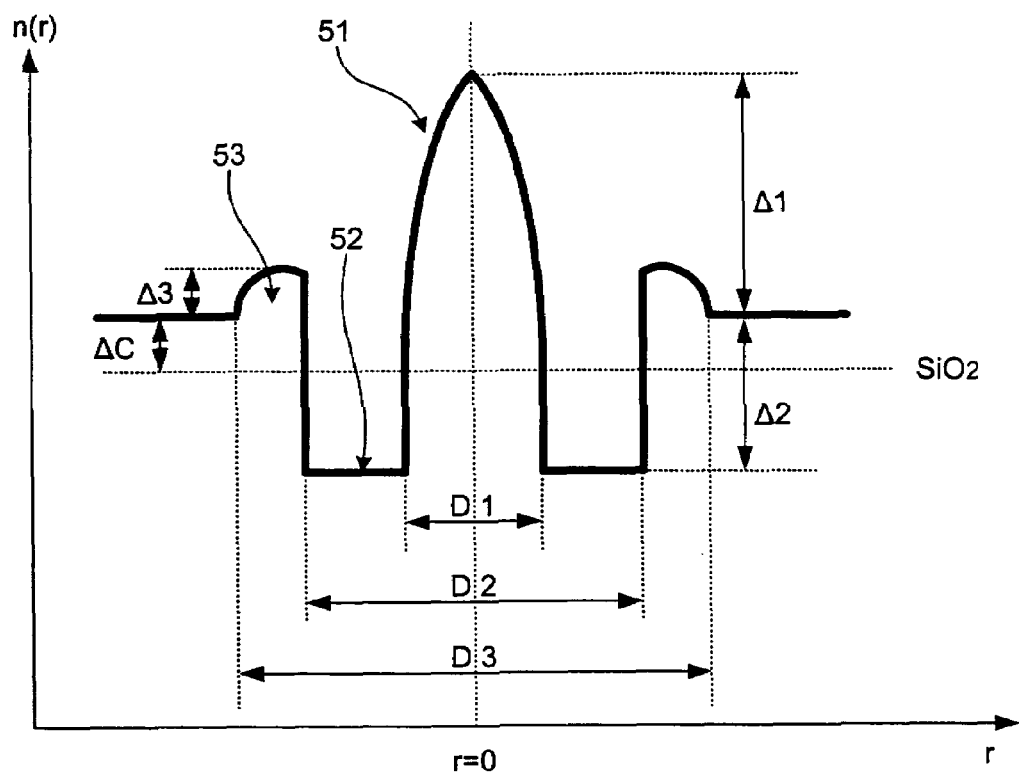
FIG. 14A shows the refractive index profile of another optical fiber according to a second embodiment of the invention.
Figure 14B:
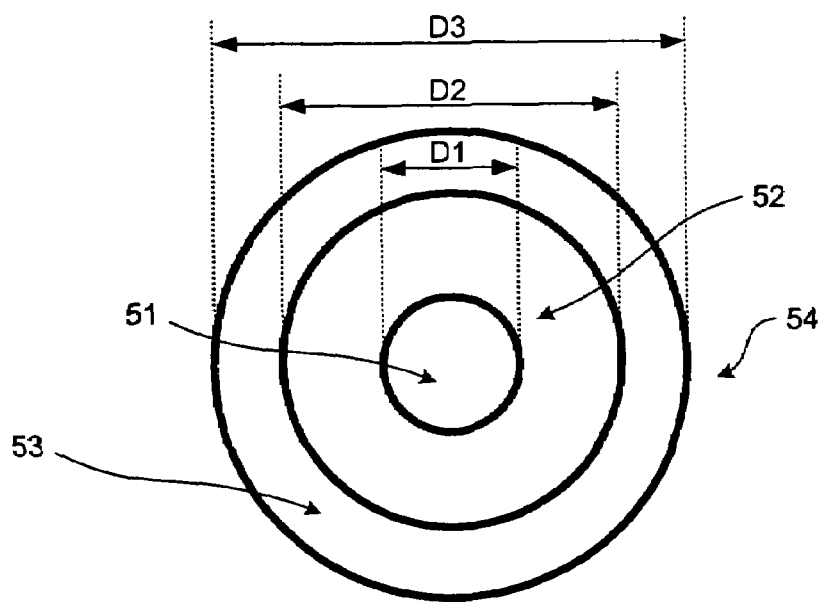
FIG. 14B is a cross sectional view of the same optical fiber.

FIGS. 14A and 14B show another example of the optical fiber according to the second embodiment. Like FIGS. 13A and 13B, FIG. 14A shows the refractive index profile of the optical fiber and FIG. 14B shows a part of the cross view thereof. The outer line of the cladding 54 is not shown.

As shown in FIG. 14A, the optical fiber has what is called the W-segment refractive index profile including the first core 51 located at the central portion and having the α refractive index profile shown in equation (8), the second core 52 arranged on the outside of the first core 51 and having a lower refractive index than the first core 51, the third core 53 arranged on the outside of the second core 52 and having a lower refractive index than the first core 51 and a higher refractive index than the second core 52, and the cladding 54 arranged on the outside of the third core 53 and having a lower refractive index than the third core 53 and a higher refractive index than the second core 52. The refractive index of the cladding 54 is higher than that of the pure silica glass indicated by dotted line.

The relative refractive index difference $\Delta 3$ of the third core 53 with respect to the cladding 54 is expressed by equation (12) below. Also, the α-value of the first core, the relative refractive index difference $\Delta 1$ of the first core 1 with respect to the cladding 54, the relative refractive index difference $\Delta 2$ of the second core 52 with respect to the cladding 54 and the relative refractive index difference $\Delta C$ of the cladding with respect to the pure silica glass are similar to those of equations (8) to (11) described above.

$$\Delta 3 = \{(n_{c3} - n_c)/n_{c3}\} \cdot 100 \tag{12}$$

where $n_{c3}$ is the maximum refractive index of the third core 53.

According to the second embodiment, the diameter D3 of the third core 53 is defined as the diameter of the position having a 1/10 of relative refractive index difference of $\Delta 3$ at the border of the third core 53 and the cladding 54. The diameter D1 of the first core 51 and the diameter D2 of the second core 52 are as defined above.

In the optical fiber according to the second embodiment, the relative refractive index difference of the second core with respect to the cladding can be easily increased to negative side by the technique of doping germanium into the cladding. Thus, an optical fiber having both a high nonlinearity and a low dispersion is readily provided.

Germanium can be doped into the cladding in the process such as outside vapor deposition (OVD) for fabricating the soot preform for the optical fiber, and by adjusting the dopantconcentration, the relative refractive index difference $\Delta C$ of the cladding with respect to pure silica glass can be adjusted.

Assume, for example, that fluorine is doped into the second core in such a manner that the relative refractive index difference of the second core with respect to the pure silica glass is −0.7% and germanium is doped into the cladding in such a manner that the relative refractive index difference $\Delta C$ of the cladding with respect to pure silica is 0.5%, where the refractive index of the pure silica is S. Then, the refractive index of the cladding is given as 1.005×S, and the refractive index of the second core is 0.993×S. Assuming that the refractive index of the cladding is $S_c$, the relative refractive index difference $\Delta 2$ of the second core with respect to the cladding is given as $\Delta 2 = (0.993 \times S - S_c)/S_c \cdot 100 = -1.194\%$. In this way, by use of the technique of doping germanium into the cladding, the relative refractive index difference of the second core with respect to the cladding can be readily increased.

The superior characteristics of the optical fiber according to the invention and the structural parameters of the refractive index profile for obtaining such characteristics are explained in detail below.

Effective Area Aeff

As described above, the nonlinear constant of the optical fiber can be effectively increased by reducing the effective area Aeff. According to the second embodiment, the effective area Aeff at the wavelength of 1550 nm is set to equal to or less than 15 μm² or preferably to equal to or less than 12 μm². By reducing the effective area Aeff in this way, an optical fiber can be obtained which has a nonlinear constant as large as equal to or more than $25 \times 10^{-10}$/W, or preferably equal to or more than $40 \times 10^{-10}$/W at the wavelength of 1550 nm.

Relative Refractive Index Difference $\Delta 1$ and $\Delta 2$

The effective area Aeff can be most effectively reduced by increasing the relative refractive index difference $\Delta 1$. In view of this, a simulation is conducted to obtain the proper relative refractive index difference Δ1. Table 7 shows the structural parameters other than Δ1 of the optical fiber used for the simulation.

The definition of Δ and α is explained above and equations (8) to (12) apply. The example 1-1 represents the W-segment refractive index profile shown in FIG. 14A, and examples 1-2, 1-3 represents the W-type refractive index profile shown in FIG. 13A.

TABLE 7

|  | Δ2 % | Δ3 % | ΔC % | D1/D3 | D2/D3 | α |
|---|---|---|---|---|---|---|
| EXAMPLE 1-1 | −1.2 | 0.20 | 0.2 | 0.55 | 0.95 | 4 |
| EXAMPLE 1-2 | −1.2 | — | 0.2 | 0.35 | — | 3 |
| EXAMPLE 1-3 | −0.75 | — | 0.2 | 0.5 | — | 3 |

Figure 15:
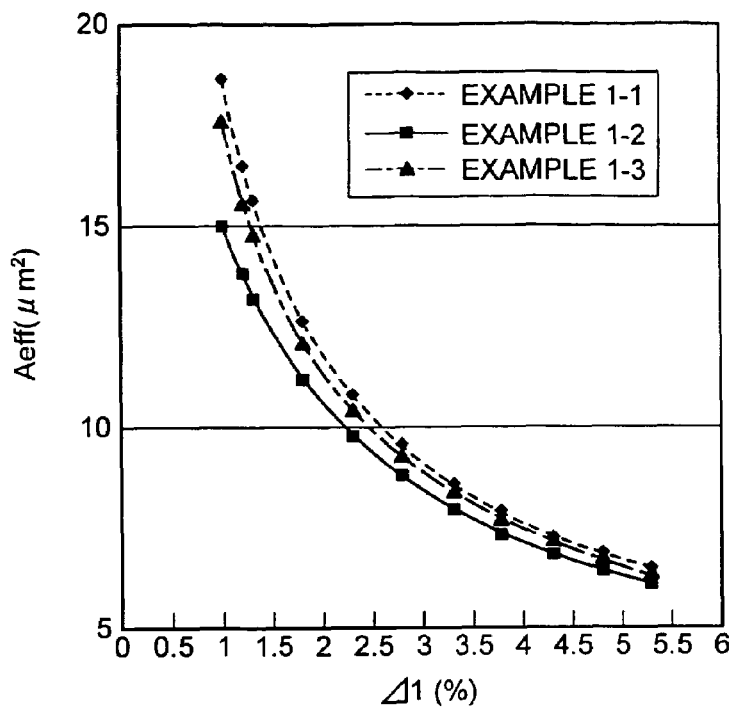
FIG. 15 is a graph that depicts the relation between Δ1 and Aeff of the optical fiber having the structure specified in Table 7.

FIG. 15 shows an example of the relation between the relative refractive index difference Δ1 and the effective area Aeff of the optical fiber having the structural parameters shown in Table 7. As shown in FIG. 15, an increased relative refractive index difference Δ1 reduces the effective area Aeff. In order for the effective area Aeff to be equal to or less than 15 μm², the relative refractive index difference Δ1 is required to be equal to or more than 1.0% as shown in FIG. 15.

With the increase in the relative refractive index difference Δ1, on the other hand, the cut-off wavelength is shifted to long wavelength side, and once the value Δ1 exceeds 5.0%, it is difficult to keep single-mode propagation. When the value Δ1 exceeds 5.0%, the dispersion slope at the wavelength of 1550 nm increases to such an extent that the dispersion difference between wavelengths is increased in the optical signal processing. Further, the core having the relative refractive index difference Δ1 exceeding 5.0% is very difficult to fabricate. Therefore, the relative refractive index difference Δ1 is preferably between 1.0% and 5.0% inclusive.

With the increase in the relative refractive index difference Δ2 to negative side, on the other hand, the absolute value of dispersion at the wavelength of 1550 nm can be decreased while at the same time decreasing the absolute value of the dispersion slope. Further, the cut-off wavelength can be shifted to short wavelength side. As described above, when the relative refractive index difference Δ1 is set between 1.0% and 5.0% inclusive, the relative refractive index difference Δ2 of equal to or less than −0.2% makes it possible to set the absolute value of the dispersion slope to equal to or less than 0.03 ps/nm²/km and the cut-off wavelength to equal to or less than 1500 nm. The relative refractive index difference Δ2 of equal to or less than −2.4%, makes it necessary to dope a large amount of fluorine into the second core or a large amount of germanium into the cladding, thereby making the fabrication very difficult. The relative refractive index difference Δ2, therefore, is preferably between −2.4% and −0.2% inclusive.

When the relative refractive index difference Δ1 is equal to or more than 2.0% and the relative refractive index difference Δ2 between −2.0% and −0.6% inclusive as shown in FIG. 15, the effective area Aeff can be reduced to or less than 12 μm² and the nonlinear constant can be increased to equal to or more than 40×10⁻¹⁰/W. Also, the addition of the third core having a higher refractive index than the cladding somewhat expands the effective area Aeff, though equal to or less than 12 μm² as shown in example 1-1. In this case, the nonlinear constant $n_2$/Aeff of equal to or more than 35×10⁻¹⁰/W is obtained. Also, for the relative refractive index difference Δ1 of between 2.0% and 4.0% inclusive and the relative refractive index difference Δ2 of between −2.0% and −0.6% inclusive, the absolute value of the dispersion slope can be reduced to or less than 0.01 ps/nm²/km. It is thus possible to obtain a sufficiently high nonlinearity and a small absolute value of the dispersion slope. Further, the optical fiber having the cut-off wavelength of equal to or less than 1500 nm is realized. It is therefore more preferable to set the relative refractive index difference Δ1 to between 2.4% and 4.0% inclusive and the relative refractive index difference Δ2 to between −2.0% and −0.6% inclusive.

Dispersion and Dispersion Slope

The optical fiber according to the second embodiment can be used in a wide wavelength range including 1550 nm, and is required to have a small absolute value of dispersion over the entire range of the operating wavelength. The optical fiber according to the present invention, therefore, preferably has the absolute value of dispersion equal to or less than 10 ps/nm/km or more preferably equal to or less than 5 ps/nm/km at the wavelength of 1550 nm.

Further, the optical fiber according to the second embodiment is required to have a small difference of dispersion over the entire range of the operating wavelength. The absolute value of the dispersion slope at the wavelength of 1550 nm of the optical fiber according to the invention, therefore, is preferably equal to or less than 0.03 ps/nm²/km or more preferably equal to or less than 0.01 ps/nm²/km.

An optical fiber is thus provided in which the dispersion difference between wavelengths and the absolute value of dispersion are small in a wide wavelength range in the neighborhood of 1550 nm. With the optical fiber according to the second embodiment, the superior optical signal processing is made possible utilizing the nonlinear phenomenon over a wide wavelength range.

In the optical fiber according to the second embodiment, a small dispersion difference is guaranteed over the entire length of the optical fiber as long as 1 km to several km. The optical fiber according to the second embodiment has a longitudinal dispersion variation of equal to or less than 1 ps/nm/km or more preferably equal to or less than 0.2 ps/nm/km for any of the wavelength in the range of 1510 nm to 1590 nm. The small difference between maximum and minimum values of dispersion in longitudinal direction makes it possible to configure a high-quality optical signal processor such as the wavelength converter or the pulse compressor utilizing the nonlinear phenomenon.

Incidentally, the dispersion variation is defined as the width of variation of the dispersion value (difference between maximum and minimum dispersions) measured by the dispersion distribution measuring instrument over the whole length of a single optical fiber making up the optical signal processor or the like. The dispersion distribution of the optical fiber can be measured by, for example, the dispersion profile measuring instrument utilizing the method conceived by Mollenauer.

In order to suppress the dispersion variation in longitudinal direction of the optical fiber in actual cases, the optical fiber preform is required to have the cores and cladding of uniform thickness. Specifically, the cores and cladding are required to have a uniform thickness by controlling the conditions for deposition during the synthesis of the soot preform of the optical fiber by OVD or VAD. The optical fiber preform is thus required to be extended to the desired outer diameter with such a high accuracy that the variation in outer diameter is equal to or less than ±0.2% of the average outer diameter. Also, the optical fiber perform is required to be controlled to substantially the same outer diameter (for example, with the variation in outer diameter equal to or less than ±0.2% of the average outer diameter of the optical fiber) in a drawing process.

Cut-off Wavelength

In the single-mode optical fiber, the cut-off wavelength λc is required to be shorter than the operating wavelength. The cut-off wavelength λc thus is preferably equal to or shorter than 1500 nm, or more preferably equal to or shorter than 1200 nm. The cut-off wavelength λc of equal to or shorter than 1500 nm guarantees the single mode operation over a wide wavelength range of equal to or more than 1500 nm. Further, when the cut-off wavelength λc is equal to or less than 1200 nm, the single-mode operation can be guaranteed in the wavelength range of equal to or more than 1200 nm, thereby making the invention applicable over a wide wavelength range including the 1.3 μm band.

Ratio D1/D2 Between Outer Diameters of First and Second Cores and Relative Refractive Index Difference ΔC of Cladding By adjusting the ratio D1/D2 between the outer diameter D1 of the first core and the outer diameter D2 of the second core, an optical fiber is obtained in which the effective area Aeff is small, the cut-off wavelength λc is short, and the absolute value of the dispersion slope is small.

The change in dispersion slope by adjusting the ratio D1/D2 between the outer diameter D1 of the first core and the outer diameter D2 of the second core is explained with reference to an example of simulation.

Table 8 shows the structural parameters other than D1/D2 of the optical fiber used for the simulation. The W-type refractive index profile shown in FIG. 13 is used in all cases. As shown in Table 8, the characteristics are changed by changing ΔC using the same core rod. The values Δ and α are similar to those described above, and equations (8) to (12) apply.

TABLE 8

| | Δ1 % | Δ2 % | ΔC % | α |
|---|---|---|---|---|
| EXAMPLE 2-1 | 3.0 | −0.7 | 0.0 | 4 |
| EXAMPLE 2-2 | 2.590 | −1.096 | 0.4 | 4 |
| EXAMPLE 2-3 | 2.284 | −1.390 | 0.7 | 4 |

Figure 16:
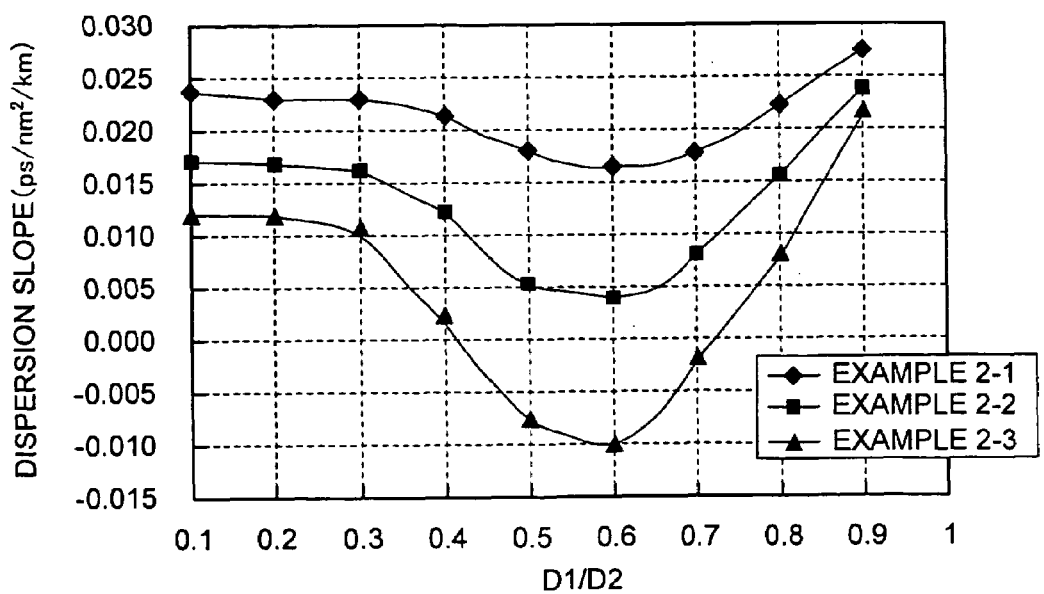
FIG. 16 is a graph that depicts the relation between the ratio D1/D2 and the dispersion slope of the optical fiber having the structure

FIG. 16 shows the relation between the ratio D1/D2 and the dispersion slope of the optical fiber having the structural parameters shown in Table 8 when the dispersion is 0 ps/nm/km at the wavelength of 1550 nm. As shown in FIG. 16, it is understood that with the approach of the ratio D1/D2 to 0.1 or 1, the dispersion slope is increased in positive direction for all examples 2-1, 2-2 and 2-3. To reduce the dispersion slope, therefore, it is necessary to set the ratio D1/D2 to about 0.5. It is also seen that the dispersion slope can be reduced with the increase of ΔC. Especially for the ratio D1/D2 of equal to or less than 0.8, the dispersion slope can be reduced considerably. For the ratio D1/D2 of 0.8, for instance, the dispersion slope is reduced 0.007 ps/nm²/km more for the example 2-2 than for the example 2-1, and 0.014 ps/nm²/km more for the example 2-3 than for the example 2-1. On the other hand, when the ratio D1/D2 is 0.9, the dispersion slope can be reduced only 0.003 ps/nm²/km more for the example 2-2 than for the example 2-1, and only 0.005 ps/nm²/km more for the example 2-3 than for the example 2-1.

Take note of the example 2-2 in FIG. 16. The cladding is doped with germanium so that ΔC=0.4%, and the range of the ratio D1/D2 is set to 0.4 and 0.7 inclusive. In this way, the absolute value of the dispersion slope can be reduced to equal to or less than 0.015 ps/nm²/km.

Figure 17:
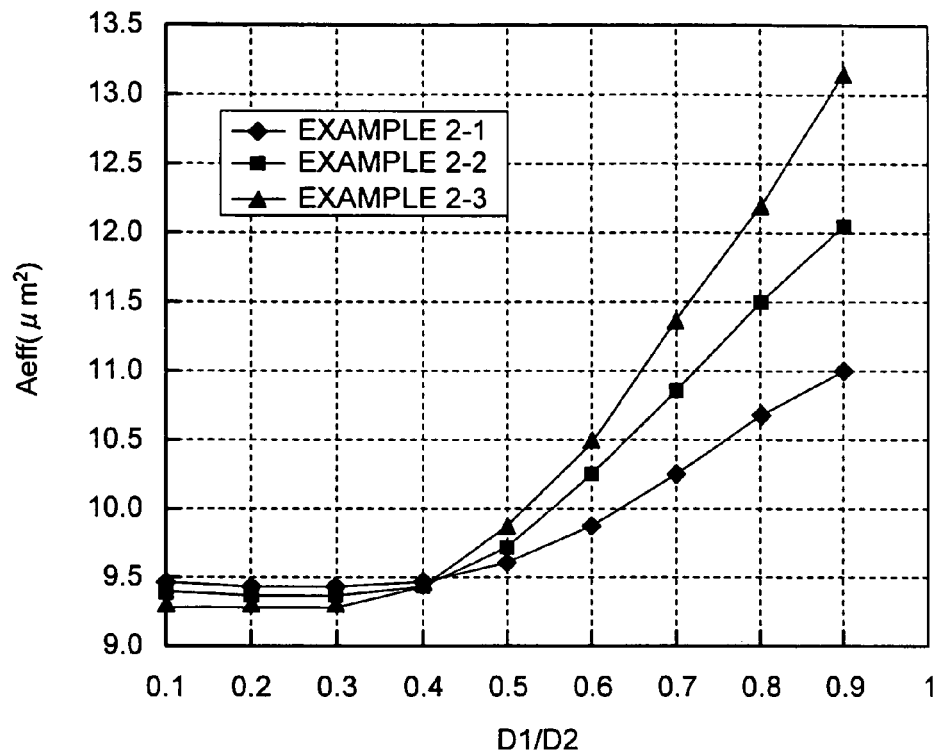
FIG. 17 is a graph that depicts the relation between D1/D2 and Aeff of the optical fiber having the structure specified in Table 8.

Further, FIG. 17 shows the relation between the ratio D1/D2 for the optical fiber having the structural parameters shown in Table 8 and the effective area Aeff at the wavelength of 1550 nm when the dispersion is 0 ps/nm/km.

As shown in FIG. 17, with the approach of the ratio D1/D2 to 0.1, the Aeff is reduced. With the approach of D1/D2 to 1, the Aeff sharply expands. This increase is more conspicuous, the larger the Δ2 to negative side. The ratio D1/D2, therefore, is preferably between 0.1 and 0.8 inclusive or more preferably between 0.4 and 0.7 inclusive.

Relative Refractive Index Difference Δ3 and Outer Diameter D3 of Third Core

The W-segment refractive index profile shown in FIG. 14A makes it possible to reduce the dispersion slope further.

In the process, the ratio D2/D3 between the outer diameter D2 of the second core and the outer diameter D3 of the third core is preferably between 0.35 and 0.99 inclusive. To increase the relative refractive index difference Δ3 of the third core with respect to pure silica glass, the third core is required to be doped with a great amount of germanium. A high skill is required, however, for stable doping of germanium. In consideration of the fabrication efficiency, therefore, the value Δ3 is desirably between 0.1% and 0.9% inclusive.

Refractive Index Profile of First Core

The fact that the refractive index profile of the first core is the α-profile and α-value is increased makes it possible to reduce both the dispersion slope and the effective area Aeff. Preferably, therefore, the refractive index profile of the first core is preferably the α-profile and the α-value is equal to or more than 3, or more preferably α-value is equal to or more than 6, where α is indicated by equation (8).

Figure 18:
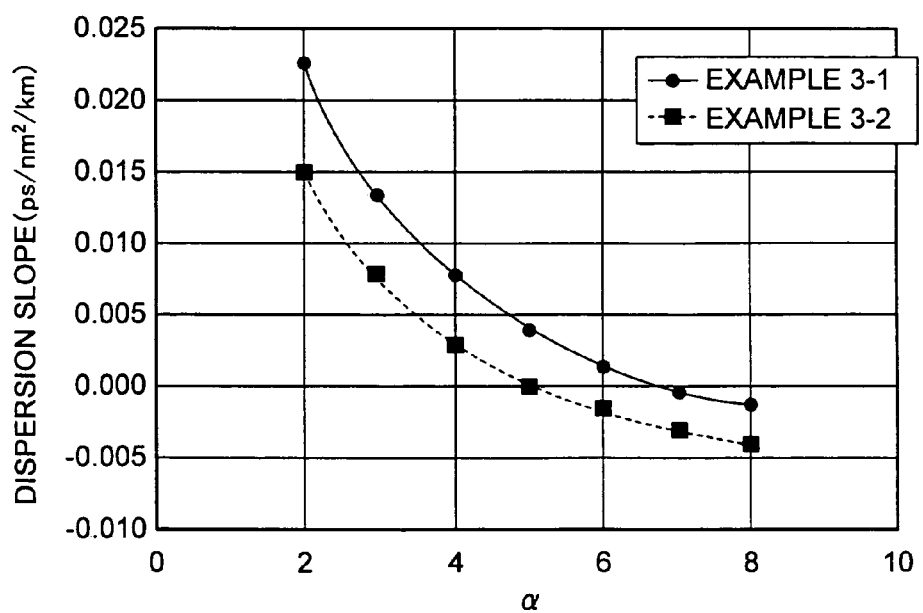
FIG. 18 is a graph that depicts the relation between the α-value and the dispersion slope of the optical fiber having the structure specified in Table 9.

The advantage of a large α-value is explained with reference to the simulation example of the structure of the optical fiber according to the second embodiment. The relation between the α-value of the optical fiber having the structural parameters shown in Table 9 and the dispersion slope is shown in FIG. 18, and the relation between the α-value and the Aeff in FIG. 19. Tn Table 9, Δ3 is the maximum relative refractive index difference of the third core with respect to the cladding, and ΔC is the relative refractive index difference of the cladding with respect to pure silica glass.

TABLE 9

| | Δ1 % | Δ2 % | Δ3 % | ΔC % | D1/D2 | D.2/D3 |
|---|---|---|---|---|---|---|
| EXAMPLE 3-1 | 2.7 | −1.3 | 0.3 | 0.3 | 0.4 | 0.7 |
| EXAMPLE 3-2 | 2.3 | −0.95 | 0.2 | 0.4 | 0.5 | 0.8 |

As shown in FIG. 18, the dispersion slope can be reduced by increasing the α-value. Especially by increasing the α-value from 2 to 3, the dispersion slope can be reduced by about 0.0092 ps/nm²/km for the example 3-1 and by about 0.008 ps/nm²/km for the example 3-2. The dispersion slope can be reduced very effectively by increasing the α-value as described above.

Figure 19:
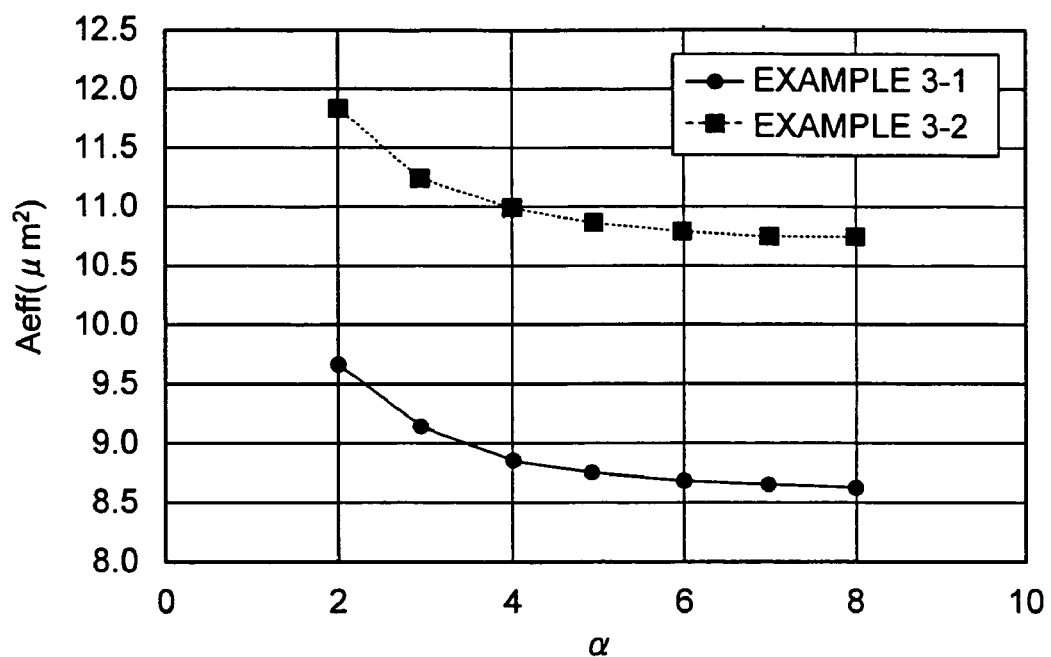
FIG. 19 is a graph that depicts the relation between the α-value and Aeff of the optical fiber having the structure specified in Table 9.

Also, as shown in FIG. 19, the effective area Aeff can be reduced by increasing the α-value. Especially by increasing the α-value from 2 to 3, the effective area Aeff can be reduced by as much as about 5% for both examples 3-1 and 3-2.

To secure a large α-value of the first core, the core preform having a large α-value is produced by VAD or MCVD, or the surface of the corepreform produced by VAD or MCVD is etched with HF or mechanically ground, so that only the central portion of the core preform having a large α-value may be used.

In this way, the α-value of 3 or more can be secured with comparative ease in the fabrication process.

Table 10 shows the structural parameters of each optical fiber shown in the comparative example 1 and the examples 1 to 10 of the second embodiment, and the characteristic values obtained by simulation. Each characteristic value is calculated under the condition of the dispersion of 0 ps/nm/km at the wavelength of 1550 nm, and MFD is an abbreviation of the mode field diameter. The W-type refractive index profile shown in FIG. 14A is employed.

In examples 1 to 10, the amount of germanium doped into the cladding is changed using the same core, and the magnitude of the relative refractive index difference ΔC between the cladding and pure silica glass is changed. The comparative example 1 represents a case where the relative refractive index difference ΔC between the cladding and pure silica glass is 0% for the comparative example 1, namely a case where the cladding is formed of pure silica glass.

In all the optical fibers in examples 1 to 10, the absolute value of dispersion slope is equal to or less than 0.03 ps/nm²/km, the cut-off wavelength λc is equal to or less than 1500 nm, and the effective area Aeff is equal to or less than 12 μm².

As shown in Table 10, with the increase in the relative refractive index difference ΔC of the cladding with respect to pure silica glass, the absolute value of dispersion slope decreases monotonically to 0.01 ps/nm²/km or less, and the cut-off wavelength λc is also shifted monotonically to short wavelength side. Also, the effective area Aeff is reduced, though slightly.

By increasing the relative refractive index difference ΔC of the cladding with respect to pure silica glass for the refractive index profile in examples 1 to 10, therefore, an optical fiber having a high nonlinearity can be produced very effectively. It is, however, difficult to dope a great amount of germanium uniformly, and therefore ΔC is preferably between 0.1% and 1.0% inclusive. Also, the superior characteristic is obtained by the outer diameter D1 of 2 μm to 5 μm of the first core.

Table 11 shows the structural parameters and the characteristic values of each optical fiber according to examples 11 to 15 of the second embodiment and a comparative example 2, and Table 12 shows the structural parameters and the characteristic values of each optical fiber in examples 16 to 19 of the second embodiment and a comparative example 3. As in Table 10, the examples 11 to 15, 16 to 17 use the same core, and only the relative refractive index difference ΔC of the cladding with respect to pure silica glass is changed. In comparative examples 2 and 3, the relative refractive index difference ΔC of the cladding with respect to pure silica glass is 0%, namely the cladding is formed of pure. silica glass. To facilitate the comparison, the dispersion at the wavelength of 1550 nm is assumed to be 0 ps/nm/km. Also, the W-type refractive index profile shown in FIG. 14A is employed.

TABLE 10

|  | Δ1 % | Δ2 % | ΔC % | D1/D2 | α | D1 μm | DISPERSION ps/nm/km | SLOPE ps/nm²/km | MFD μm | Aeff μm² | CUT-OFF nm | γ/ W/km | $n_2$/Aeff $10^{-10}$/W |
|---|---|---|---|---|---|---|---|---|---|---|---|---|---|
| COMPARATIVE EXAMPLE 1 | 3.5 | −1.0 | 0.0 | 0.4 | 4 | 3.70 | 0 | 0.0188 | 3.21 | 8.09 | 1318 | 30.5 | 74.2 |
| EXAMPLE 1 | 3.4 | −1.1 | 0.1 | 0.4 | 4 | 3.68 | 0 | 0.0169 | 3.21 | 8.08 | 1279 | 30.6 | 74.3 |
| EXAMPLE 2 | 3.29 | −1.2 | 0.2 | 0.4 | 4 | 3.64 | 0 | 0.0148 | 3.20 | 8.06 | 1242 | 30.6 | 74.4 |
| EXAMPLE 3 | 3.19 | −1.3 | 0.3 | 0.4 | 4 | 3.62 | 0 | 0.0126 | 3.20 | 8.05 | 1206 | 30.7 | 74.5 |
| EXAMPLE 4 | 3.09 | −1.39 | 0.4 | 0.4 | 4 | 3.59 | 0 | 0.0103 | 3.20 | 8.04 | 1172 | 30.7 | 74.6 |
| EXAMPLE 5 | 2.99 | −1.49 | 0.5 | 0.4 | 4 | 3.56 | 0 | 0.0078 | 3.20 | 8.03 | 1138 | 30.7 | 74.7 |
| EXAMPLE 6 | 2.88 | −1.59 | 0.6 | 0.4 | 4 | 3.54 | 0 | 0.0032 | 3.20 | 8.03 | 1106 | 30.7 | 74.7 |
| EXAMPLE 7 | 2.78 | −1.69 | 0.7 | 0.4 | 4 | 3.52 | 0 | 0.0023 | 3.20 | 8.03 | 1074 | 30.7 | 74.7 |
| EXAMPLE 8 | 2.68 | −1.79 | 0.8 | 0.4 | 4 | 3.50 | 0 | −0.0008 | 3.20 | 8.03 | 1044 | 30.7 | 74.7 |
| EXAMPLE 9 | 2.58 | −1.88 | 0.9 | 0.4 | 4 | 3.48 | 0 | −0.0043 | 3.20 | 8.03 | 1014 | 30.7 | 74.7 |
| EXAMPLE 10 | 2.48 | −1.98 | 1.0 | 0.4 | 4 | 3.46 | 0 | −0.0083 | 3.20 | 8.03 | 986 | 30.7 | 74.6 |

TABLE 11

|  | Δ1 % | Δ2 % | ΔC % | D1/D2 | α | DISPERSION ps/nm/km | SLOPE ps/nm²/km | MFD μm | Aeff μm² | CUT-OFF nm | γ/ W/km | $n_2$/Aeff $10^{-10}$/W |
|---|---|---|---|---|---|---|---|---|---|---|---|---|
| COMPARATIVE EXAMPLE 2 | 3.0 | −0.7 | 0.0 | 0.5 | 4 | 0 | 0.0122 | 3.45 | 9.39 | 1345 | 23.7 | 58.3 |
| EXAMPLE 11 | 2.79 | −0.9 | 0.2 | 0.5 | 4 | 0 | 0.0065 | 3.46 | 9.46 | 1267 | 23.5 | 58.1 |
| EXAMPLE 12 | 2.59 | −1.1 | 0.4 | 0.5 | 4 | 0 | 0.0000 | 3.47 | 9.55 | 1197 | 23.3 | 57.6 |
| EXAMPLE 13 | 2.39 | −1.29 | 0.6 | 0.5 | 4 | 0 | −0.0075 | 3.49 | 9.66 | 1132 | 23.1 | 56.9 |
| EXAMPLE 14 | 2.18 | −1.49 | 0.8 | 0.5 | 4 | 0 | −0.0168 | 3.52 | 9.81 | 1072 | 22.7 | 56.1 |
| EXAMPLE 15 | 1.98 | −1.68 | 1.0 | 0.5 | 4 | 0 | −0.0289 | 3.55 | 10 | 1016 | 22.3 | 55 |

TABLE 12

|  | Δ1 % | Δ2 % | ΔC % | D1/D2 | α | D1 μm | DISPERSION ps/nm/km | SLOPE ps/nm²/km | MFD μm | Aeff μm² | CUT-OFF nm | γ/ W/km | $n_2$/Aeff $10^{-10}$/W |
|---|---|---|---|---|---|---|---|---|---|---|---|---|---|
| COMPARATIVE EXAMPLE 3 | 2.5 | −1.0 | 0.0 | 0.4 | 4 | 3.88 | 0 | 0.0137 | 3.56 | 9.87 | 1143 | 17.6 | 47.6 |
| EXAMPLE 16 | 2.4 | −1.1 | 0.1 | 0.4 | 4 | 3.86 | 0 | 0.0108 | 3.56 | 9.87 | 1104 | 17.6 | 47.6 |
| EXAMPLE 17 | 2.19 | −1.3 | 0.3 | 0.4 | 4 | 3.81 | 0 | 0.0041 | 3.56 | 9.9 | 1030 | 17.6 | 47.5 |
| EXAMPLE 18 | 1.99 | −1.49 | 0.5 | 0.4 | 4 | 3.77 | 0 | −0.0052 | 3.57 | 9.95 | 962 | 17.5 | 47.2 |
| EXAMPLE 19 | 1.79 | −1.69 | 0.7 | 0.4 | 4 | 3.76 | 0 | −0.0211 | 3.58 | 10.05 | 900 | 17.3 | 46.8 |

In all the optical fibers in examples 11 to 15, 16 to 19, the absolute value of the dispersion slope is equal to or less than 0.03 ps/nm²/km, the cut-off wavelength λc is equal to or less than 1500 nm, and the Aeff is equal to or less than 12 μm².

As shown in Tables 11, 12, with the increase in the relative refractive index difference ΔC of the cladding with respect to pure silica glass, the dispersion slope provisionally decreases monotonically until the absolute value of the dispersion slope comes to assume 0.01 ps/nm²/km or less. As shown in examples 14, 15, 19, however, an excessive increase in ΔC increases the dispersion slope to negative side, and the absolute value of the dispersion slope again increases beyond 0.01 ps/nm²/km. Also, with the increase in ΔC, the cut-off wavelength λc monotonically shifts to short wavelength side while the Aeff expands.

As far as the optical fiber according to examples 11 to 15, 16 to 19 is concerned, therefore, the dispersion slope is reduced and the cut-off wavelength shifted to short wavelength side very effectively by increasing the relative refractive index difference ΔC of the cladding with respect to pure silica glass, as long as ΔC is in the range of 0.6% or less.

Table 13 shows the structural parameters and the characteristic values of each optical fiber in the examples 20 to 22 according to the invention and a comparative example 4, and Table 14 shows the structural parameters and the characteristic values of each optical fiber of examples 23 to 24 according to the invention and a comparative example 5. As in Table 10, the examples 20 to 22, 23 to 24 use the same core, while changing only the relative refractive index difference ΔC of the cladding with respect to pure silica glass. In comparative examples 4, 5, the relative refractive index difference ΔC of the cladding with respect to pure silica glass is 0%, namely the cladding is formed of pure silica glass. To facilitate comparison, the dispersion at the wavelength of 1550 nm is assumed to be 0 ps/nm/km. Also, the W-segment refractive index profile shown in FIG. 15A is employed.

TABLE 13

|  | Δ1 % | Δ2 % | Δ3 % | ΔC % | D1/D2 | D2/D3 | α | DISPERSION ps/nm/km | SLOPE ps/nm²/km | MFD μm | Aeff μm² | CUT-OFF nm | γ/ W/km | $n_2$/Aeff $10^{-10}$/W |
|---|---|---|---|---|---|---|---|---|---|---|---|---|---|---|
| COMPARATIVE EXAMPLE 4 | 2.8 | −0.55 | 0.4 | 0 | 0.5 | 0.8 | 5 | 0 | 0.0145 | 3.63 | 10.35 | 1382 | 19.6 | 48.3 |
| EXAMPLE 20 | 2.59 | −0.75 | 0.4 | 0.2 | 0.5 | 0.8 | 5 | 0 | 0.0084 | 3.65 | 10.45 | 1286 | 19.4 | 47.9 |
| EXAMPLE 21 | 2.39 | −0.95 | 0.4 | 0.4 | 0.5 | 0.8 | 5 | 0 | 0.0013 | 3.67 | 10.58 | 1205 | 19.1 | 47.3 |
| EXAMPLE 22 | 2.19 | −1.14 | 0.4 | 0.6 | 0.5 | 0.8 | 5 | 0 | −0.0044 | 3.73 | 10.96 | 1150 | 18.5 | 45.6 |

TABLE 14

|  | Δ1 % | Δ2 % | Δ3 % | ΔC % | D1/D2 | D2/D3 | α | DISPERSION ps/nm/km | SLOPE ps/nm²/km | MFD μm | Aeff μm² | CUT-OFF nm | γ/ W/km | $n_2$/Aeff $10^{-10}$/W |
|---|---|---|---|---|---|---|---|---|---|---|---|---|---|---|
| COMPARATIVE EXAMPLE 5 | 3.2 | −1 | 0.5 | 0 | 0.38 | 0.78 | 6 | 0 | 0.0103 | 3.24 | 8.33 | 1446 | 28.7 | 67.2 |
| EXAMPLE 23 | 2.99 | −1.2 | 0.5 | 0.2 | 0.38 | 0.78 | 6 | 0 | 0.0059 | 3.24 | 8.33 | 1342 | 28.7 | 67.2 |
| EXAMPLE 24 | 2.79 | −1.39 | 0.5 | 0.4 | 0.38 | 0.78 | 6 | 0 | 0.0008 | 3.24 | 8.34 | 1267 | 28.7 | 67.1 |

The behavior of the dispersion slope, the cut-off wavelength λc and the effective area Aeff with the increase of ΔC is similar to those having the W-type refractive index profile comparative example 6 and the example 25, the comparative example 7 and the example 26, employ substantially the same dispersion in the production process.

TABLE 15

|  | Δ1 % | Δ2 % | ΔC % | D1/D2 | α | D1 μm | DISPERSION ps/nm/km | SLOPE ps/nm²/km | MFD μm | Aeff μm² | CUT-OFF nm | γ/ W/km | $n_2$/Aeff $10^{-10}$/W |
|---|---|---|---|---|---|---|---|---|---|---|---|---|---|
| COMPARATIVE EXAMPLE 6 | 2.9 | −1 | 0.0 | 0.25 | 4.7 | 3.78 | 2.00 | 0.020 | 3.33 | 9.38 | 1249 | 20.9 | 56.5 |
| EXAMPLE 25 | 2.29 | −1.56 | 0.6 | 0.25 | 4.7 | 3.77 | 1.94 | 0.011 | 3.43 | 9.35 | 1053 | 21.0 | 56.8 |

TABLE 16

|  | Δ1 % | Δ2 % | ΔC % | D1/D2 | α | D1 μm | DISPERSION ps/nm/km | SLOPE ps/nm²/km | MFD μm | Aeff μm² | CUT-OFF nm | γ/ W/km | $n_2$/Aeff $10^{-10}$/W |
|---|---|---|---|---|---|---|---|---|---|---|---|---|---|
| COMPARATIVE EXAMPLE 7 | 2.9 | −1 | 0.0 | 0.25 | 4.7 | 3.6 | −2.11 | 0.0140 | 3.40 | 8.09 | 1183 | 21.8 | 59.0 |
| EXAMPLE 26 | 2.29 | −1.59 | 0.6 | 0.25 | 4.7 | 3.59 | −2.11 | 0.0058 | 3.37 | 9.08 | 982 | 21.9 | 59.3 | shown in Tables 11, 12. The dispersion slope can be reduced and the cut-off wavelength can be shifted to short wavelength side effectively with the value ΔC=0.6% or less.

As shown in Tables 13, 14 assume that the third core is provided. The cut-off wavelength is easily shifted to long wavelength side. Nevertheless, the cut-off wavelength can be shifted to short wavelength side by doping germanium into the cladding and increasing the relative refractive index difference ΔC of the cladding with respect to pure silica glass. Even with the refractive index profile in which the cut-off wavelength is liable to be easily shifted to long wavelength side, the cut-off wavelength can be very advantageously shifted to short wavelength side by use of the technique of doping germanium into the cladding as described above.

Using the result of simulation described above, the optical fiber is actually produced, as the result thereof is shown in Tables 15, 16. Table 15 shows the structural parameters and the characteristic values of each optical fiber specified in the example 25 of the second embodiment and the comparative example 6, and Table 16 shows the structural parameters and the characteristic values of each optical fiber specified in the example 26 and the comparative example 7. These comparative examples and examples use the same core, and the amount of germanium doped into the cladding is changed thereby to change the relative refractive index difference ΔC of the cladding with respect to pure silica glass. In examples 25, 26, germanium is doped so that the relative refractive index difference ΔC is 0.6%. To facilitate comparison, the In both the examples 25 and 26, the absolute value of dispersion at the wavelength of 1550 nm is equal to or less than 20 ps/nm/km, the effective area Aeff at the wavelength of 1550 nm is equal to or less than 15 μm², and the nonlinear constant at the wavelength of 1550 nm is equal to or more than $25 \times 10^{-10}$/W. Thus, substantially the same characteristics are obtained as in simulation.

The comparative example 6 is compared with the example 25. In the example 25, the dispersion slope is smaller by 0.009 ps/nm²/km, and the cut-off wavelength is shifted to short wavelength side by about 200 nm. Also, the effective area Aeff is smaller, though slightly, for the example 25 than for the comparative example 6. As a result, the example 25 has a larger nonlinear constant $n_2$/Aeff. Comparison between the comparative example 7 and the example 26 indicates a similar result. It is thus considered very effective to increase the relative refractive index difference ΔC of the cladding with respect to pure silica glass.

The use of the optical fiber according to the second embodiment for the optical signal processor makes it possible to process the optical signal with a stable performance over a wide wavelength range.

The optical fiber according to the second embodiment, for example, can be used with the optical wavelength converter shown in FIG. 11 or the pulse compressor shown in FIG. 12. In addition, the optical fiber according to the second embodiment can be used with the waveform shaper or the like.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical fiber comprising:
a first core located in a central portion of the optical fiber and having a first refractive index;
a second core located in an outer periphery of the first core and having a second refractive index lower than the first refractive index;
a third core located in an outer periphery of the second core and having a third refractive index lower than the first refractive index and higher than the second refractive index; and
a cladding located in an outer periphery of the third core and having a fourth refractive index lower than the third refractive index and higher than the second refractive index,
wherein an absolute value of dispersion at a wavelength of 1550 nm is equal to or less than 10 ps/nm/km, an effective area at the wavelength of 1550 nm is equal to or less than 15 μm$^2$, and a nonlinear constant $n_2$/Aeff at the wavelength of 1550 nm is equal to or more than $25 \times 10^{-10}$/W.

2. The optical fiber according to claim 1,
wherein the effective area Aeff at the wavelength of 1550 nm is equal to or less than 12 μm$^2$, and the nonlinear constant $n_2$/Aeff at the wavelength of 1550 nm is equal to or more than $35 \times 10^{-10}$/W.

3. The optical fiber according to claim 1,
wherein a relative refractive index difference Δ1 of the first core with respect to the cladding ranges from 1.5% to 5.0% inclusive, a relative refractive index difference Δ2 of the second core with respect to the cladding ranges from −1.4% to −0.1% inclusive, and a relative refractive index difference Δ3 of the third core with respect to the cladding ranges from 0.1% to 1.0% inclusive.

4. The optical fiber according to claim 1,
wherein a relative refractive index difference Δ1 of the first core with respect to the cladding ranges from 2.4% to 4.0% inclusive, a relative refractive index difference Δ2 of the second core with respect to the cladding ranges from −1.4% to −0.7% inclusive, and a relative refractive index difference Δ3 of the third core with respect to the cladding ranges from 0.1% to 1.0% inclusive.

5. The optical fiber according to claim 1,
wherein the absolute value of dispersion at the wavelength of 1550 nm is equal to or less than 5 ps/nm/km.

6. The optical fiber according to claim 1,
wherein an absolute value of dispersion slope at the wavelength of 1550 nm is equal to or less than 0.03 ps/nm$^2$/km.

7. The optical fiber according to claim 1,
wherein an absolute value of dispersion slope at the wavelength of 1550 nm is equal to or less than 0.01 ps/nm$^2$/km.

8. The optical fiber according to claim 1,
wherein a difference between maximum and minimum values of dispersion along a longitudinal direction of the optical fiber per km at any one of wavelengths of 1550 nm to 1590 nm is equal to or less than 1 ps/nm/km.

9. The optical fiber according to claim 1,
wherein a difference between maximum and minimum values of dispersion along a longitudinal direction of the optical fiber per km at any one of wavelengths of 1510 nm to 1590 nm is equal to or less than 0.2 ps/nm/km.

10. The optical fiber according to claim 1,
wherein a cut-off wavelength λc of the optical fiber is equal to or less than 1500 nm.

11. The optical fiber according to claim 1,
wherein a ratio D1/D2 between an outer diameter D1 of the first core and an outer diameter D2 of the second core ranges from 0.3 to 0.8 inclusive.

12. The optical fiber according to claim 1,
wherein a ratio D1/D2 between an outer diameter D1 of the first core and an outer diameter D2 of the second core ranges from 0.4 to 0.7 inclusive.

13. The optical fiber according to claim 3,
wherein a ratio D2/D3 between an outer diameter D2 of the second core and an outer diameter D3 of the third core ranges from 0.35 to 0.99 inclusive, and satisfies the following relation:

$$D2/D3 > \Delta 3 + 0.25 \ (0.1\% \leq \Delta 3 \leq 0.2\%)$$

$$D2/D3 > (1/2) \cdot \Delta 3 + 0.35 \ (0.2\% \leq \Delta 3 \leq 0.6\%)$$

$$D2/D3 > (1/4) \cdot \Delta 3 + 0.5 \ (0.6\% \leq \Delta 3 \leq 1.0\%).$$

14. The optical fiber according to claim 1,
wherein a refractive index profile of the first core is an α-profile, where α-value is equal to or more than 3.0.

15. The optical fiber according to claim 1,
wherein a refractive index profile of the first core is an α-profile, where α-value is equal to or more than 6.0.

16. An optical signal processor using an optical fiber, the optical fiber comprising:
a first core located in a central portion of the optical fiber and having a first refractive index;
a second core located in an outer periphery of the first core and having a second refractive index lower than the first refractive index;
a third core located in an outer periphery of the second core and having a third refractive index lower than the first refractive index and higher than the second refractive index; and
a cladding located in an outer periphery of the third core and having a fourth refractive index lower than the third refractive index and higher than the second refractive index,
wherein an absolute value of dispersion at a wavelength of 1550 nm is equal to or less than 10 ps/nm/km, an effective area at the wavelength of 1550 nm is equal to or less than 15 μm$^2$, and a nonlinear constant $n_2$/Aeff at the wavelength of 1550 nm is equal to or more than $25 \times 10^{-10}$/W.

17. The optical signal processor according to claim 16,
wherein the optical signal processor is an optical wavelength converter.

18. The optical signal processor according to claim 16,
wherein the optical signal processor is a pulse compressor.

19. An optical fiber comprising:
a first core located in a central portion of the optical fiber and having a first refractive index;
a second core located in an outer periphery of the first core and having a second refractive index lower than the first refractive index; and a cladding located in an outer periphery of the second core and having a third refractive index lower than the first refractive index and higher than the second refractive index, wherein an absolute value of dispersion at a wavelength of 1550 nm is equal to or less than 20 ps/nm/kin, an effective area Aeff at the wavelength of 1550 nm is equal to or less than 15 µm$^2$, and the nonlinear constant at the wavelength of 1550 nm is equal to or more than $25 \times 10^{-10}$/W, and wherein the cladding is doped with germanium.

20. The optical fiber according to claim 19, wherein the effective area Aeff at the wavelength of 1550 nm is equal to or less than 12 µm$^2$ and the nonlinear constant $n_2$/Aeff at the wavelength of 1550 nm is equal to or more than $35 \times 10^{-10}$/W.

21. The optical fiber according to claim 19, wherein a relative refractive index difference of the cladding with respect to pure silica glass ranges from 0.1% to 1.0% inclusive.

22. The optical fiber according to claim 19, wherein a relative refractive index difference Δ1 of the first core with respect to the cladding ranges from 1.0% to 5.0% inclusive and a relative refractive index difference Δ2 of the second core with respect to the cladding ranges from −2.4% to −0.2% inclusive.

23. The optical fiber according to claim 19, wherein a relative refractive index difference Δ1 of the first core with respect to the cladding ranges from 2.0% to 4.0% inclusive and a relative refractive index difference Δ2 of the second core with respect to the cladding ranges from −2.0% to −0.6% inclusive.

24. The optical fiber according to claim 19, wherein the absolute value of dispersion at the wavelength of 1550 nm is equal to or less than 10 ps/nm/km.

25. The optical fiber according to claim 19, wherein the absolute value of dispersion at the wavelength of 1550 nm is equal to or less than 5 ps/nm/km.

26. The optical fiber according to claim 19, wherein an absolute value of dispersion slope at the wavelength of 1550 nm is equal to or less than 0.03 ps/nm$^2$/km.

27. The optical fiber according to claim 19, wherein an absolute value of dispersion slope at the wavelength of 1550 nm is equal to or less than 0.01 ps/nm$^2$/km.

28. The optical fiber according to claim 19, wherein a difference between maximum and minimum values of dispersion along a longitudinal direction of the optical fiber at any one of wavelengths of 1510 nm to 1590 nm is equal to or less than 1 ps/nm/km.

29. The optical fiber according to claim 19, wherein a difference between maximum and minimum values of dispersion along a longitudinal direction of the optical fiber at any one of wavelengths of 1510 nm to 1590 nm is equal to or less than 0.2 ps/nm/km.

30. The optical fiber according to claim 19, wherein a cut-off wavelength λc of the optical fiber is equal to or less than 1500 nm.

31. The optical fiber according to claim 19, wherein a cut-off wavelength λc of the optical fiber is equal to or less than 1200 nm.

32. The optical fiber according to claim 19, wherein a ratio D1/D2 between an outer diameter D1 of the first core and an outer diameter D2 of the second core ranges from 0.1 to 0.8 inclusive.

33. The optical fiber according to claim 19, wherein a ratio D1/D2 between an outer diameter D1 of the first core and an outer diameter D2 of the second core ranges from 0.4 to 0.7 inclusive.

34. The optical fiber according to claim 19, further comprising a third core located in an outer periphery of the second core and having a fourth refractive index lower than the first refractive index and higher than the third refractive index.

35. The optical fiber according to claim 34, wherein a relative refractive index difference Δ3 of the third core with respect to the cladding ranges from 0.1% to 0.9% inclusive.

36. The optical fiber according to claim 34, wherein a ratio D2/D3 between an outer diameter D2 of the second core and an outer diameter D3 of the third core ranges from 0.35 to 0.99 inclusive.

37. The optical fiber according to claim 19, wherein a refractive index profile of the first core is an α-profile, where α-value is equal to or more than 3.0.

38. The optical fiber according to claim 19, wherein a refractive index profile of the first core is the α-profile, where α-value is equal to or more than 6.0.

39. An optical signal processor using an optical fiber, the optical fiber comprising:

a first core located in a central portion of the optical fiber and having a first refractive index;

a second core located in an outer periphery of the first core and having a second refractive index lower than the first refractive index; and a cladding located in an outer periphery of the second core and having a third refractive index lower than the first refractive index and higher than the second refractive index, wherein an absolute value of dispersion at a wavelength of 1550 nm is equal to or less than 20 ps/nm/km, an effective area Aeff at the wavelength of 1550 nm is equal to or less than 15 µm$^2$, and the nonlinear constant at the wavelength of 1550 nm is equal to or more than $25 \times 10^{-10}$/W, and wherein the cladding is doped with germanium.

40. The optical signal processor according to claim 39, wherein the optical signal processor is an optical wavelength converter.

41. The optical signal processor according to claim 39, wherein the optical signal processor is a pulse compressor.

* * * * *